United States Patent
Wang et al.

(10) Patent No.: US 9,258,774 B2
(45) Date of Patent: Feb. 9, 2016

(54) METHOD FOR INFORMATION PROCESSING AND ELECTRONIC APPARATUS THEREOF

(71) Applicants: Beijing Lenovo Software Ltd., Beijing (CN); Lenovo (Beijing) Co., Ltd., Beijing (CN)

(72) Inventors: Hui Wang, Beijing (CN); Shaowei Chen, Beijing (CN); Lei Zhao, Beijing (CN); Yu Chen, Beijing (CN); Min Yin, Beijing (CN); Dongping Huang, Beijing (CN); Pengfei Hao, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 135 days.

(21) Appl. No.: 14/229,937

(22) Filed: Mar. 30, 2014

(65) Prior Publication Data
US 2015/0163733 A1    Jun. 11, 2015

(30) Foreign Application Priority Data

Dec. 11, 2013  (CN) .......................... 2013 1 0676505
Dec. 11, 2013  (CN) .......................... 2013 1 0677076
Feb. 28, 2014  (CN) .......................... 2014 1 0073897

(51) Int. Cl.
*H04W 4/00*    (2009.01)
*H04W 48/20*   (2009.01)

(52) U.S. Cl.
CPC .................... *H04W 48/20* (2013.01)

(58) Field of Classification Search
USPC ......... 370/338, 331, 328, 329, 342, 341, 400, 370/352, 336, 335, 252; 709/231; 715/764; 711/154
See application file for complete search history.

(56) References Cited

U.S. PATENT DOCUMENTS 8,606,990 B2 * 12/2013 Saito .................... G06F 13/1678
                                                          711/105
2008/0034064 A1    2/2008  Choi et al.
(Continued)

FOREIGN PATENT DOCUMENTS

CN    101378270 A    3/2009
CN    102333278 A    1/2012
CN    103209406 A    7/2013

OTHER PUBLICATIONS

First Chinese Office Action regarding Application No. 201410073897.0 dated Jun. 1, 2015. Partial English translation provided by Unitalen Attorneys at Law.
(Continued)

*Primary Examiner* — Chi H Pham
*Assistant Examiner* — Alexander O Boakye
(74) *Attorney, Agent, or Firm* — Harness, Dickey & Pierce, P.L.C.

(57) ABSTRACT

A method for information processing and an electronic device thereof are provided. The method includes: obtaining, in the case that a first application runs, a first control operation for the first application; during a process for establishing a group in response to the first control operation, controlling a first wireless communication module to serve as a wireless access point and naming the wireless access point with parameter information for the first group; establishing, after response information is obtained, a communication path directly connected to at least one second electronic device, the response information being response information generated in the case that the at least one second electronic device scans and selects the wireless access point; and obtaining, via the communication path, information indicating that the at least one second electronic device joins the first group.

20 Claims, 6 Drawing Sheets

(56) References Cited

U.S. PATENT DOCUMENTS

2008/0075034 A1\* 3/2008 Hsieh .................... H04W 48/16
370/328
2014/0044113 A1\* 2/2014 Chu ...................... H04W 48/16
370/338

OTHER PUBLICATIONS

Second Chinese Office Action regarding Application No. 201410073897.0 dated Oct. 26, 2015. English translation provided by Unitalen Attorneys at Law.

\* cited by examiner

METHOD FOR INFORMATION PROCESSING AND ELECTRONIC APPARATUS THEREOF

The present application claims the priority to Chinese Patent Application No. 201410073897.0, entitled as "METHOD FOR INFORMATION PROCESSING AND ELECTRONIC APPARATUS THEREOF", filed on Feb. 28, 2014 with State Intellectual Property Office of People's Republic of China, which is incorporated herein by reference in its entirety.

The present application claims the priority to Chinese Patent Application No. 201310677076.3, entitled as "METHOD FOR INFORMATION PROCESSING AND ELECTRONIC APPARATUS THEREOF", filed on Dec. 11, 2013 with State Intellectual Property Office of People's Republic of China, which is incorporated herein by reference in its entirety.

The present application claims the priority to Chinese Patent Application No. 201310676505.5, entitled as "METHOD FOR INFORMATION PROCESSING AND ELECTRONIC APPARATUS THEREOF", filed on Dec. 11, 2013 with State Intellectual Property Office of People's Republic of China, which is incorporated herein by reference in its entirety.

FIELD

The disclosure relates to the field of electronic technique, and in particular to a method for information processing and an electronic apparatus thereof.

BACKGROUND

With the fast development of the electronic technology, people's life is increasingly closely connected with the network and various electronic products with different functions. With the improving of the life standard, notebook computers, PADs, smart phones and so on are widely popular, in which, a handheld mobile device such as a smart phone and a PAD are popular fastest in particular.

With the popularity of the mobile device, smart phones, tablets etc increasingly become an essential entertainment device for people. People establish interconnection with other users by utilizing Bluetooth of these mobile devices so as to participate in an entertainment action together such as a game.

However, when the user is during a trip or participates in an outdoor activity, a case that no external network is available will often appear. Presently, in the case of no external network, the user often firstly establishes Bluetooth connection with electronic apparatus of other users by using the Bluetooth function of the electronic apparatus, and then enters the same game application to establish a group for playing the game.

However, during the process for achieving the technical solutions of the embodiments of the disclosure, technology described above at least exists the following technical problems:

The case of firstly establishing connection with Bluetooth and then entering the application to establish a group for playing the game needs to meet the following condition: only two electronic apparatus within a close distance may join the group, and after the communication connection is established between the two electronic apparatus, the application may be entered and the same group may be joined.

That is to say, there is a technical problem in the conventional technology that after an electronic apparatus enters an application and establishes a group, the electronic apparatus may not automatically establish connection with electronic apparatus selecting to join the group in the case of no external network.

SUMMARY

The embodiments of the disclosure provide a method for information processing and an electronic apparatus, which solve a technical problem in the conventional technology that after an electronic apparatus enters an application and establishes a group, the electronic apparatus may not automatically establish connection with electronic apparatus selecting to join the group in the case of no external network.

The technical solution of the embodiments of the disclosure may be implemented as follows.

The disclosure provides a method for information processing applied to a first electronic apparatus, the first electronic apparatus including a first wireless communication module and being able to obtain a first application, in the case that the first electronic apparatus has the first application and the first wireless communication module is in an operating state, the method including:

obtaining, in the case that the first application is run, a first control operation for the first application, the first control operation being for instructing to establish a first group capable of including at least two participants;

during a process for establishing the first group in response to the first control operation, controlling the first wireless communication module to serve as a wireless access point and naming the wireless access point with parameter information for the first group, with the wireless access point generating a radiation signal to make the wireless access point being able to be scanned by at least one second electronic apparatus in the case that the at least one second electronic apparatus is within coverage of the radiation signal;

establishing, after response information is obtained, a communication path connected to the at least one second electronic apparatus in a wireless link layer, the response information being generated when the wireless access point is scanned and selected by the at least one second electronic apparatus within the coverage of the wireless access point; and obtaining, via the communication path, information indicating that the at least one second electronic apparatus joins the first group.

The wireless access point is a WIFI hot spot.

After the obtaining, via the communication path, information indicating that the at least one second electronic apparatus joins the first group, the method further includes:

cutting off the communication path and controlling the first wireless communication module to stop serving as the wireless access point when the first application is stopped.

The first electronic apparatus further includes a display touch unit, the display touch unit includes a display region; the display region is able to display a target object denoting the at least one second electronic apparatus when the first application is run by the first electronic apparatus; the establishing a communication path directly connected to the at least one second electronic apparatus in a wireless link layer includes:

receiving a second control operation by the display touch unit, wherein the second control operation is acted on the target object;

receiving a first identification in response to the second control operation, wherein the first identification is for identifying the at least one second electronic apparatus;

acquiring first information according to the first identification, wherein the first information is for identifying the at least one second electronic apparatus; and displaying the first information within the display region;

establishing a communication path connected to the at least one second electronic apparatus in a wireless link layer according to the first information, wherein data amount of the first information is greater than data amount of the first identification.

The first identification is a communication number of the at least one second electronic apparatus or a MAC address of the at least one second electronic apparatus.

The first electronic apparatus includes a storage unit; the first information is stored in the storage unit in advance;

the acquiring first information according to the first identification includes:

querying the first information stored in the storage unit according to the first identification.

The first information is stored in a third electronic apparatus, the acquiring first information according to the first identification includes:

acquiring the first information stored in the third electronic apparatus according to the first identification.

The first electronic apparatus further includes a display module, the first electronic apparatus is able to obtain a first application and N generic applications, N is a positive integer, the establishing a communication path directly connected to the at least one second electronic apparatus in a wireless link layer includes:

acquiring and displaying a first controls when the first application is run;

receiving a first triggering operation for the first controls, and in response to the received triggering operation, controlling the wireless communication module to scan to obtain K wireless access points which corresponds to the at least one second electronic apparatus, the K wireless access points having a one-to-one correspondence with K display identifiers, K is a positive integer;

displaying the K display identifiers by the display module;

obtaining a second control operation for selecting a first display identifier from the K display identifiers; and establishing, in response to the second control operation, a communication path directly connected to a first wireless access point corresponding to the first display identifier in a wireless link layer;

the obtaining, via the communication path, information indicating that the at least one second electronic apparatus joins the first group include:

starting, based on the first display identifier, a first generic application of the N generic applications that corresponds to the first display identifier to run the first generic application.

Controlling the wireless communication module to scan to obtain K wireless access points include:

controlling the first wireless communication module to scan to obtain M wireless access points, M≥K; and performing filtering, based on M display identifiers having a one-to-one correspondence with the M wireless access points, to obtain K wireless access points of the M wireless access points that satisfy a first preset condition.

The first preset condition is that: a display identifier corresponding to the wireless access point is a display identifier corresponding to the genetic application which the first electronic apparatus already has.

The disclosure provides an electronic apparatus, which is a first electronic apparatus, the first electronic apparatus including a first wireless communication module and being able to obtain a first application, in the case that the first electronic apparatus has the first application and the first wireless communication module is in an operating state, the electronic apparatus including:

a first obtaining module, configured to obtain, in the case that the first application is run, a first control operation for the first application, the first control operation being for instructing to establish a first group capable of including at least two participants;

a first response module, configured for, during a process for establishing the first group in response to the first control operation, controlling the wireless communication module to serve as a wireless access point and naming the wireless access point with parameter information for the first group, with the wireless access point generating a radiation signal, to make the wireless access point being able to be scanned by at least one second electronic apparatus in the case that at least one second electronic apparatus is within coverage of the radiation signal; and a first establishing module, configured for, after response information is obtained, establishing a communication path directly connected to the at least one second electronic apparatus in a wireless link layer, the response information being response information generated when the wireless access point is scanned and selected by the at least one second electronic apparatus within coverage of the wireless access point, and obtaining, via the communication group, information indicating that the at least one second electronic apparatus joins the first group.

The wireless access point is a WIFI hot spot.

The first electronic apparatus further includes:

a first cutting off module, configured to, when the first application is stopped, cut off the communication path and control the wireless communication module to stop serving as the wireless access point.

The first electronic apparatus further includes a display touch unit, and the first establishing module includes a processing unit and a receiving unit, the display touch unit includes a display region; the processing unit is able to run a first application; and the display region is able to display a target object denoting the at least one second electronic apparatus when the first application is run by the processing unit;

the display touch unit is further configured to receive a second control operation, the second control operation is acted on the target object;

the receiving unit is configured to receive a first identification based on the second control operation, the first identification is for identifying the at least one second electronic apparatus;

the processing unit is further configured to acquire first information according to the first identification, the first identification is for identifying the at least one second electronic apparatus;

the display touch unit is further configured to display the first information within the display region; and the processing unit is further configured to establish a communication path connected to the at least one second electronic apparatus in a wireless link layer according to the first information, wherein data amount of the first information is greater than data amount of the first identification.

The first identification is a communication number of the at least one second electronic apparatus or a MAC address of the at least one second electronic apparatus.

The first electronic apparatus includes a storage unit;

the storage unit is configured to store the first information in advance;

the processing unit is configured to query the first information stored in the storage unit according to the first identification.

The first information is stored in a third electronic apparatus;

the processing unit is configured to acquire the first information stored in the third electronic apparatus according to the first identification.

The first electronic apparatus further includes a display module, the first electronic apparatus is able to obtain a first application and N generic applications, N is a positive integer, and after the first electronic apparatus has the first application and in a case where the first wireless communication module is in a working state, the first establishing module includes:

a control module, configured to acquire and display a first controls when the first application is run;

a scan module, configured to receive a first triggering operation for the first controls, and in response to the received triggering operation, control the wireless communication module to scan to obtain K wireless access points which corresponds to the at least one second electronic apparatus, the K wireless access points having a one-to-one correspondence with K display identifiers, K is a positive integer, the K wireless access points correspond to at least one second electronic apparatus;

a display module, configured to display the K display identifiers;

an obtaining module, configured to obtain a second control operation for selecting a first display identifier from the K display identifiers; and a response module, configured to establish, in response to the second control operation, a communication path connected to a first wireless access point corresponding to the first display identifier in a wireless link layer;

the first establishing module, further configured to start, based on the first display identifier, a first generic application of the N generic applications that corresponds to the first display identifier so as to run the first generic application.

The scan module includes:

the first wireless communication module, configured to perform scanning to obtain M wireless access points, M≥K; and a filtering unit, configured to perform filtering, based on M display identifiers having a one-to-one correspondence with the M wireless access points, to obtain K wireless access points of the M wireless access points that satisfy a first preset condition.

The filtering unit is further configured to perform filtering, based on M display identifiers having a one-to-one correspondence with the M wireless access points, to obtain K wireless access points of the M wireless access points, with display identifiers corresponding to the K wireless access points being display identifiers corresponding to the generic applications which the first electronic apparatus already has.

One or more technical solutions provided by the embodiments of the disclosure at least have the following technical effects or advantages:

according to the method and the electronic apparatus provided by the embodiments of the disclosure, in the case that the first application runs, the first wireless communication module is controlled to serve as the wireless access point so as to generate a radiation signal and the wireless access point is named with parameter information for the first group during a process for establishing the first group, such that the second electronic apparatus within coverage of the radiation signal may scan the wireless access point and a communication path directly connected to the second electronic apparatus is established when the second electronic apparatus selects to join the first group, thereby achieving a technical effect that after an electronic apparatus enters an application and establishes a group, the electronic apparatus may automatically establish connection with electronic apparatus selecting to join the group in the case of no external network;

according to the method and the electronic apparatus provided by the embodiments of the disclosure, the wireless access point is provided as a WIFI hot spot so as to achieve that more than two electronic apparatus may join the same group for the application simultaneously;

according to the method and the electronic apparatus provided by the embodiments of the disclosure, when the first application stops running, the communication path is cut off and the first wireless communication module is controlled to stop serving as the wireless access point, so as to prevent other electronic apparatus from acquiring information stored on the first electronic apparatus via the communication path, thereby achieving a technical effect that the security of the information stored on the first electronic apparatus is improved.

Further in the method for information processing and the electronic apparatus described in the embodiments of the disclosure, the first electronic apparatus receives the first identification and acquires the first information according to the first identification. Compared to a case where the first information stored in the second electronic apparatus or a network, the first information is received directly, the embodiments of the disclosure break a limit to data amount of the first information in the conventional technology, and information such as a picture and/or a word having a better display effect can be acquired by the user by increasing the data amount, meanwhile a time delay due to a large amount of data received from the second electronic apparatus or the network can be avoided, then use satisfaction is improved.

Besides, with the method and electronic apparatus provided by the embodiments of the disclosure, when a first application is run, K display identifiers corresponding to K wireless access points obtained by scanning are displayed; and in a case where a user determines to select a first display identifier, a communication path to a first wireless access point corresponding to the first display identifier is established, and a first generic application corresponding to the first display identifier is started, so as to achieve a technical effect that in a case where there is no external network, the electronic apparatus can automatically start an application corresponding to a display identifier for a wireless access point when establishing a connection with the wireless access point obtained by scanning, to achieve data interaction for the application, thereby reducing operation complexity.

With the method and electronic apparatus provided by the embodiments of the disclosure, a wireless access point is displayed only if a display identifier corresponding to the wireless access point is a display identifier corresponding to a genetic application which the first electronic apparatus already has, so as to achieve a technical effect that an application corresponding to the displayed display identifier can be directly started on the first electronic apparatus without installation, thereby reducing operation complexity.

With the method and electronic apparatus provided by the embodiments of the disclosure, in a case where the first electronic apparatus is connected with a server, a wireless access point is displayed only if a display identifier corresponding to the wireless access point is a display identifier corresponding to a genetic application stored in the server, so as to achieve a

DETAILED DESCRIPTION

Figure 1:
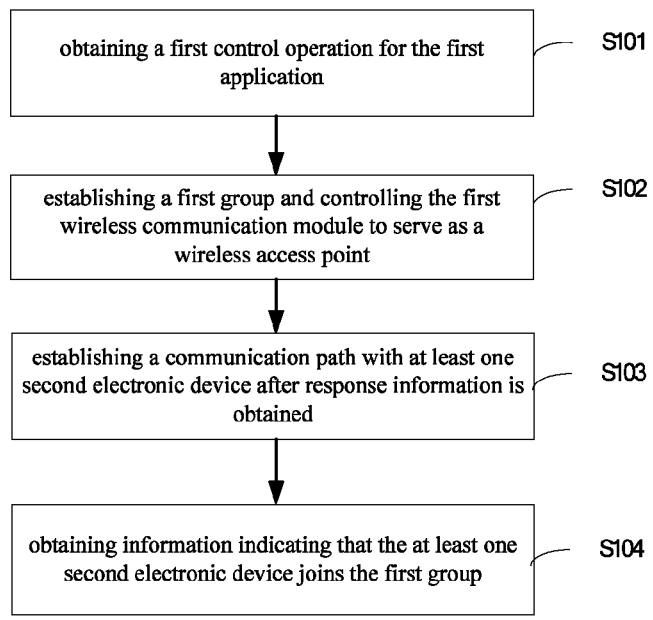
FIG. 1 is a flow chart for a method for information processing according to a first embodiment of the disclosure.

The embodiments of the disclosure provide a method for information processing and an electronic apparatus thereof, which achieve a technical effect that after an electronic apparatus enters an application and establishes a group, a connection between the electronic apparatus and an electronic apparatus selected to join the group may be established automatically in the case of no external network.

A method for information processing is provided in an embodiment of the disclosure. The method is applied to a first electronic apparatus, the first electronic apparatus including a first wireless communication module and being able to obtain a first application, in the case that the first electronic apparatus has the first application and the first wireless communication module is in an operating state, the method includes:

obtaining, in the case that the first application is run, a first control operation for the first application, the first control operation being used to instruct to establish a first group capable of including at least two participants;

during a process for establishing the first group in response to the first control operation, controlling the first wireless communication module to serve as a wireless access point and naming the wireless access point with parameter information for the first group, wherein a radiation signal is generated by the wireless access point such that the wireless access point may be scanned in the case that at least one second electronic apparatus is within coverage of the radiation signal;

establishing, after response information is obtained, a communication path directly connected to the at least one second electronic apparatus in a wireless link layer, wherein the response information is response information generated when the wireless access point is scanned and selected by the at least one second electronic apparatus within the coverage of the wireless access point; and obtaining, via the communication path, information indicating that the at least one second electronic apparatus to join the first group.

It may be seen from above that: in the case that the first application is run, the first wireless communication module is controlled to serve as the wireless access point so as to generate the radiation signal and the wireless access point is named with parameter information for the first group during a process for establishing the first group, such that the wireless access point may be scanned by the second electronic apparatus within the coverage of the radiation signal, and a communication path directly connected to the second electronic apparatus is established when the second electronic apparatus joins the first group, thereby achieving a technical effect that after an application is run by an electronic apparatus and a group is established, a connection between the electronic apparatus and the electronic apparatus joining the group may be automatically established in the case of no external network.

In order to better understand the technical solutions described above, the technical solutions described above will be illustrated in detail in conjunction with the accompanying drawings in the specification and the specific embodiments.

An embodiment provides a method for information processing applied to a first electronic apparatus. The first electronic apparatus includes a first wireless communication module, and a first application may be obtained by the first electronic apparatus. The first electronic apparatus may be an electronic apparatus such as a smart phone, a notebook computer, a tablet, a desktop computer, which is not listed one by one in the embodiment.

Reference is made to FIG. 1 which is a flow chart for a method for information processing according to an embodiment of the disclosure. In the case that the first electronic apparatus has the first application and the first wireless communication module is in an operating state, the method includes step S101-S104.

Step S101, obtaining, in the case that the first application is run, a first control operation for the first application, the first control operation being used to instruct to establish a first group capable of including at least two participants.

Step 102, during a process for establishing the first group in response to the first control operation, controlling the first wireless communication module to serve as a wireless access point and naming the wireless access point with parameter information for the first group, wherein a radiation signal is generated by the wireless access point such that the wireless access point may be scanned in the case that at least one second electronic apparatus is within coverage of the radiation signal.

Step S103, establishing, after response information is obtained, a communication path directly connected to the at least one second electronic apparatus in a wireless link layer, wherein the response information is response information generated when the wireless access point is scanned and selected by the at least one second electronic apparatus within the coverage of the wireless access point.

Step S104, obtaining, via the communication path, information indicating that the at least one second electronic apparatus to join the first group.

In practice, the second electronic apparatus may also be an electronic apparatus such as a smart phone, a notebook computer, a tablet, a desktop computer, which is not listed one by one in the embodiment.

Firstly, in step S101, the first control operation for the first application is obtained in the case that the first application is run. The first control operation is used to instruct to establish a first group capable of including at least two participants.

In a specific implementing process, the first control operation may be an operation for an interface, for example a touch-clicking operation, a mouse clicking operation made, on an interface on which the first application is run, may also be a preset gesture operation or a shaking operation for the first electronic apparatus, which is not listed one by one in the embodiment.

Subsequently, after the first control operation is obtained in step S101, the method proceeds to step S102, i.e., during a process for establishing the first group in response to the first control operation, controlling the first wireless communication module to serve as a wireless access point and naming the wireless access point with parameter information for the first group, wherein a radiation signal is generated by the wireless access point such that the wireless access point may be scanned in the case that at least one second electronic apparatus is within coverage of the radiation signal.

In the embodiment of the disclosure, the wireless access point may a WIFI hot spot. The wireless access point is provided as a WIFI hot spot so as to meet that more than two electronic apparatus join the same group for the same application simultaneously.

It will be illustrated in detail hereinafter that in the case of no communication connection is established between the first electronic apparatus and the second electronic apparatus, how a radiation signal is generated such that the wireless access point may be scanned by the second electronic apparatus.

In the case that the first electronic apparatus is not within external network coverage, a first wireless communication module in the first electronic apparatus still has a function for sending and receiving a signal due to its hardware structure. After the first wireless communication module in the first electronic apparatus is controlled to enable the function for sending and receiving a signal, a radiation signal is generated and sent by the first wireless communication module consistently. At this time, if the second electronic apparatus is within the coverage of the radiation signal and a second wireless communication module of the second electronic apparatus also are enabled the function for sending and receiving a signal, the second wireless communication module may receive the radiation signal sent from the first wireless communication module in the case that no communication connection is established between the first electronic apparatus and the second electronic apparatus, thus the first electronic apparatus is scanned.

In step S102, naming the wireless access point with parameter information for the first group may achieve that in the case that the first application in the at least one second electronic apparatus is run, the wireless access point named with the parameter information based on the parameter information for the first group of the first application may be scanned by the at least one second electronic apparatus, thereby the wireless access point named with the parameter information for the first group being determined by the at least one second electronic apparatus via joining the first group.

After a radiation signal is generated such that the wireless access point may be scanned and selected by the at least one second electronic apparatus in step S102, the method proceeds to step S103, i.e., establishing, after response information is obtained, a communication path directly connected to the at least one second electronic apparatus in a wireless link layer, wherein the response information is response information generated when the wireless access point is scanned and selected by the at least one second electronic apparatus within the coverage of the wireless access point In the specific implementing process, the response information is a connecting request sent to the first electronic apparatus after the wireless access point named with the parameter information for the first group is determined by the at least one second electronic apparatus via joining the first group. After the connection request is obtained the first electronic apparatus, a communication path directly connected to the at least one second electronic apparatus is established in a wireless link layer based on the connection request.

After the communication path is established in step S103, the method proceeds to step S104, i.e., obtaining, via the communication path, information indicating that the at least one second electronic apparatus to join the first group.

In the embodiment of the disclosure, after obtaining, via the communication path, information indicating that the at least one second electronic apparatus to join the first group, the method further includes:

cutting off the communication path and controlling the first wireless communication module to stop serving as the wireless access point in the case that the first application is stopped.

Specifically, cutting off the communication path and controlling the first wireless communication module to stop serving as the wireless access point in the case that the first application is stopped may prevent information stored on the first electronic apparatus being acquired by other electronic apparatus via the communication path, thereby achieving a technical effect that the security of the information stored on the first electronic apparatus is improved.

In the following, it is illustrated from the view of human-computer interaction, and it is assumed that the first electronic apparatus is a smart phone, the first application is a chess and card game installed on the smart phone.

For example, a user a is on a trip, the user a wants to connect to a network on a train so as to play the chess and card game with other smart phone users, but the user a does not know which user being around also wants to play the same chess and card game, the user a opens an application software for the chess and card game on the smart phone and touch-clicks an option "a mode without external network" on a display interface for the application software, the display interface for the application software displays two options of "joining a group" and "establishing a new group".

After the user a touch-clicks the option of "establishing a new group", a first group in response to the selecting operation is established by the smart phone, a first wireless communication module in the smart phone is controlled to serve as a wireless access point and the function for sending and receiving a signal is enabled, thus a radiation signal is generated and sent, and the wireless access point is named as "Application 001".

Next, when a user b also wants to play the chess and card game, the user b opens the application software for the chess and card game on the tablet and touch-clicks an option of "a mode without external network" on a display interface for the application software, as well as selects an option of "joining a group" between two options of "joining a group" and "establishing a new group", at this time the wireless access point established by the user a is scanned by a first wireless communication module in the tablet of the user b. The wireless access point established by the user a is displayed as a group named as "Application 001" on the interface for the chess and card application software of the tablet.

After the user b touch-clicks the group named as "Application 001", a connection request is sent to the smart phone of the user a.

After the connection request is received by the smart phone of the user a, a communication path directly connected to the tablet of the user b is established in a wireless link layer. The tablet of the user b joins the first group named as "Application 001" via the communication path.

The networking chess and card game within the first group is achieved by the smart phone of the user a and the tablet of the user b.

In another aspect, based on the same inventive concept, the disclosure provides a method for information processing applied to the at least one second electronic apparatus in the embodiment shown in FIG. 1 according to another embodiment of the disclosure.

An embodiment provides a method for information processing applied to a second electronic apparatus. The second electronic apparatus includes a second wireless communication module and may obtain a first application. The second electronic apparatus may be an electronic apparatus such as a smart phone, a notebook computer, a tablet, a desktop computer, which is not listed one by one in the embodiment.

Figure 2:
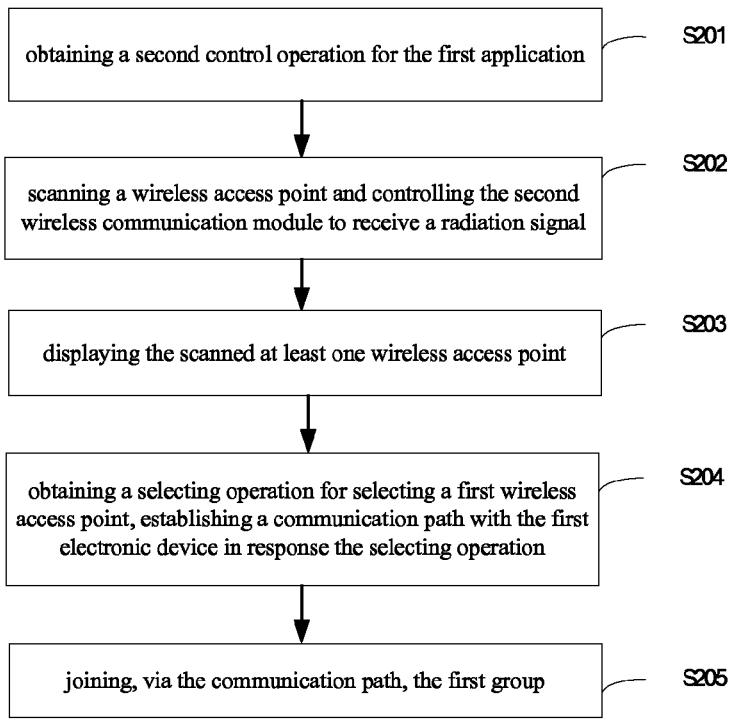
FIG. 2 is a flow chart for a method for information processing according to a second embodiment of the disclosure.

Reference is made to FIG. 2 which is a flow chart for a method for information processing according to an embodiment of the disclosure. In the case that the second electronic apparatus has the first application and the second electronic apparatus is in an operating state, the method includes step S201-S205.

Step S201, obtaining, in the case that the first application is run, a second control operation for the first application, the second control operation being used to instruct to scan at least one wireless access point named with parameter information of a group of the first application.

Step S202, during a process for scanning the at least one wireless access point in response to the second control operation, controlling the second wireless communication module to receive a radiation signal, such that the at least one wireless access point may be scanned by the second electronic apparatus in the case that the second electronic apparatus is within coverage of a radiation signal sent from the at least one wireless access point.

Step S203, displaying the scanned at least one wireless access point.

Step S204, obtaining a selecting operation for selecting a first wireless access point from the at least one wireless access point, and generating and sending, in response to the selecting operation, response information to the first wireless access point, thus a communication path directly connected to the first electronic apparatus in a wireless link layer is established, the first electronic apparatus being a device by which the first wireless access point is established via establishing a first group for the first application.

Step S205, joining, via the communication path, the first group.

The case that the at least one wireless access point named with parameter information of a group of the first group is scanned by the second electronic apparatus in the case of no communication connection establishing with the first electronic apparatus has been illustrated in detail in the embodiment shown in FIG. 1, which is not described here.

In the embodiment, displaying the scanned at least one wireless access point may include: displaying parameter information of a group corresponding to the scanned at least one wireless access point.

The wireless access point will be displayed by the second electronic apparatus in the form of a group after the wireless access point named with parameter information of a group of the first application is scanned. For example, in the case that the scanned wireless access point is named as "Application 001", because the wireless access point is named according to parameter information for establishing the group by the first electronic apparatus, the scanned wireless access point is displayed as a group named as "Application 001" by the second electronic apparatus, such that a communication path with the first electronic apparatus by which the wireless access point is established may be established by the user and the user may join the group named as "Application 001", after the user selects the group named as "Application 001" in the second electronic apparatus.

In the embodiment, after joining, via the communication path, the first group, the method further includes:

cutting off the communication path and controlling the second wireless communication module to stop receiving a radiation signal when the first application is stopped.

Being the same as the embodiment shown in FIG. 1, cutting off the communication path and controlling the second wireless communication module to stop receiving a radiation signal when the first application is stopped may prevent information stored on the second electronic apparatus from being acquired by other electronic apparatus via the communication path, thereby achieving a technical effect that the security of the information stored on the second electronic apparatus is improved.

Hereinafter it is illustrated from a view of human-computer interaction, and it is assumed that the second electronic apparatus is a tablet and the first application is a chess and card game installed on the smart phone.

For example, when the user b also wants to play the chess and card game, the user b opens an application software of the chess and card game on the tablet and touch-clicks an option of "a mode without an external network" on a display interface for the application software, and the tablet displays two options of "joining a group" and "establishing a new group".

After the user b touch-clicks the option of "joining a group", a second wireless communication module in the tablet is controlled to enable a function for sending and receiving a signal in response to the selecting operation, thus a radiation signal sent from the external wireless access point is received.

After a wireless access point which is established via establishing a group of a chess and card game by the user a and named as "Application 001" and a wireless access point which is established via establishing a group for a chess and card game by a user c and named as "second chess and card" are scanned by the second wireless communication module on the tablet of the user b, "Application 001" and "second chess and card" are displayed on the software interface of the chess and card application of the tablet of the user b.

After the user b touch-clicks a group named as "Application 001", a connection request is sent to the smart phone of the user a.

After the connection request is received, a communication path directly connected to the tablet of the user b in a wireless link layer is established by the smart phone of the user a. The tablet of the user b joins a first group named as "Application 001" via the communication path.

The networking chess and card game within the first group is achieved by the smart phone of the user a and the tablet of the user b.

In still another aspect, based on the same inventive concept, the disclosure provides an electronic apparatus corresponding to the method in the embodiment shown in FIG. 1 according to another embodiment of the disclosure.

The third embodiment provides an electronic apparatus, which may be a first electronic apparatus. The first electronic apparatus includes a first wireless communication module and a first application may be obtained the first electronic apparatus. The first electronic apparatus may be an electronic apparatus such as a smart phone, a notebook computer, a tablet, a desktop computer, which is not listed one by one in the embodiment.

Figure 3:
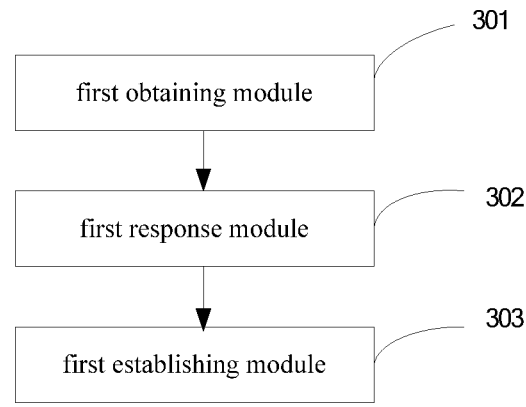
FIG. 3 is a schematic structural diagram of an electronic apparatus according to a third embodiment of the disclosure.

Reference is made to FIG. 3 which is a flow chart of an electronic apparatus according to an embodiment. In the case that the first electronic apparatus has the first application and the first wireless communication module is in an operating state, the electronic apparatus includes a first obtaining module 301, a first response module 302 and a first establishing module 303.

The first obtaining module 301 is configured to obtain a first control operation for the first application in the case that the first application is run. The first control operation is used to instruct to establish a first group capable of including at least two participants.

The first response module 302 is configured for, during a process for establishing the first group in response to the first control operation, controlling the first wireless communication module to serve as a wireless access point and naming the wireless access point with parameter information for the first group, wherein a radiation signal is generated by the wireless access point such that the wireless access point may be scanned in the case that at least one second electronic apparatus is within coverage of the radiation signal.

The first establishing module 303 is configured for, after response information is obtained, establishing a communication path directly connected to the at least one second electronic apparatus in a wireless link layer, wherein the response information is response information generated when the wireless access point is scanned and selected by the at least one second electronic apparatus within the coverage of the wireless access point; and via the communication path, information indicating that the at least one second electronic apparatus to join the first group.

In the embodiment, the wireless access point is a WIFI hot spot.

In the embodiment, the electronic apparatus further includes:

a first cutting off module, which is configured to cut off the communication path and control the first wireless communication module to stop serving as the wireless access point in the case that the first application is stopped.

The electronic apparatus provided in the embodiment and the method for information processing provided in the embodiment shown in FIG. 1 are two aspects based on the same inventive concept. The implementing process for the method has been described in detail above, hence those skilled in the art may understand the structure and implementing process of the electronic apparatus according to the preceding description, which is not described here for the conciseness of the specification.

In still another aspect, based on the same inventive concept, the disclosure provides an electronic apparatus corresponding to the method illustrated in the FIG. 2 according to another embodiment of the disclosure.

An embodiment provides an electronic apparatus, which may be a second electronic apparatus. The second electronic apparatus includes a second wireless communication module a first application may be obtained by the second electronic apparatus. The second electronic apparatus may be an electronic apparatus such as a smart phone, a notebook computer, a tablet, a desktop computer, which is not listed one by one in the embodiment.

Figure 4:
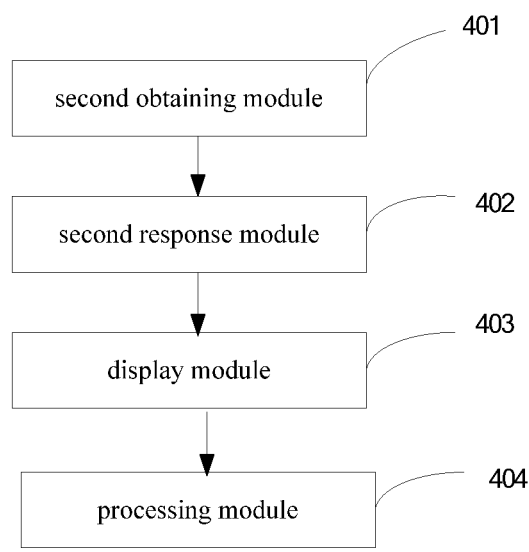
FIG. 4 is a schematic structural diagram of an electronic apparatus according to a fourth embodiment of the disclosure.

Reference is made to FIG. 4 which is a schematic structural diagram of an electronic apparatus according to an embodiment. In the case that the second electronic apparatus has the first application and the second wireless communication module is in an operating state, the electronic apparatus includes a second obtaining module 401, a second response module 402, a display module 403 and a processing module 404.

The second obtaining module 401 is configured to obtain a second control operation for the first application in the case that the first application is run. The second control operation is used to instruct to scan at least one wireless access point named by parameter information of a group of the first application.

The second response module 402 is configured to control the second wireless communication module to receive a radiation signal during a process for scanning the at least one wireless access point in response to the control operation, such that the at least one wireless access point may be scanned by the second electronic apparatus in the case that the second electronic apparatus is within coverage of a radiation signal sent from the at least one wireless access point.

The display module 403 is configured to display the scanned at least one wireless access point.

The processing module 404 is configured for, obtaining a selecting operation for selecting a first wireless access point from the at least one wireless access point, and generating and sending, in response to the selecting operation, response information to the first wireless access point, thus a communication path directly connected to the first electronic apparatus in a wireless link layer is established, the first electronic apparatus being a device by which the first wireless access point is established via establishing a first group for the first application; and joining, via the communication path, the first group.

In the embodiment, the display 403 is further configured to:

display parameter information of a group corresponding to the scanned at least one wireless access point.

In the embodiment, the electronic apparatus further includes:

a second cutting off module, configured to cut off the communication path and control the second wireless communication path to stop receiving a signal when the first application is stopped.

The electronic apparatus provided by the embodiment and the method for information processing in the embodiment shown in FIG. 2 are two aspects based on the same inventive concept. The implementing process for the method has been described in detail above, those skilled in the art may understand the structure and the implementing process of the electronic apparatus in the embodiment according to the preceding description, which is not described here for the conciseness of the specification.

The technical solutions in the embodiments of the disclosure described above at least have the following technical effects or advantages:

According to the method and the electronic apparatus provided by the embodiments of the disclosure, in the case that the first application is run, the first wireless communication module is controlled to serve as the wireless access point so as to generate a radiation signal and the wireless access point is named with parameter information for the first group during a process for establishing the first group, such that the wireless access point may be scanned by the second electronic apparatus within coverage of the radiation signal and a communication path directly connected to the second electronic apparatus is established when the second electronic apparatus joins the first group, thereby achieving a technical effect that after an electronic apparatus enters an application and establishes a group, connection established by the electronic apparatus automatically with the electronic apparatus to join the group in the case of no external network.

According to the method and the electronic apparatus provided by the embodiments of the disclosure, the wireless access point is provided as a WIFI hot spot so as to achieve that more than two electronic apparatus may join the same group for the application simultaneously.

According to the method and the electronic apparatus provided by the embodiments of the disclosure, when the first application is stopped, the communication path is cut off and the first wireless communication module is controlled to stop serving as the wireless access point, so as to prevent information stored on the first from being acquired by other electronic apparatus via the communication path, thereby achieving a technical effect that the security of the information stored on the first electronic apparatus is improved.

Those skilled in the art should understand that the embodiments of the disclosure may be implemented as a method, a system or a computer program product. Therefore, the disclosure may employ only hardware embodiments, only software embodiments or embodiments of a combination of software and hardware. Furthermore, the disclosure may employ computer program products implemented on one or more computer available storage mediums (including but not limiting to a magnetic disc memory, a CD-ROM, an optical memory) which include computer available program codes.

The disclosure is described by referring to flow charts and/or block diagrams according to the methods, devices (systems) and computer program products of the embodiments of the disclosure. It should be understood that each flow and/or block of the flow charts and/or block diagrams and a combination of the flow and/or the block in the flow charts and/or the block diagrams may be implemented by computer program instructions. These computer program instructions may be provided to a general computer, a dedicated computer, an embedded processor or a processor of other programmable processing devices so as to generate a machine, such that the instructions executed by a computer or a processor of other programmable processing devices generate an apparatus which is used to achieve the functions specified in one or more flows in the flow charts and/or one or more blocks in the block diagrams.

These computer program instructions may also be stored in a computer readable memory which may guide the computer or other programmable data processing devices to work in a specific way, such that the instructions stored in the computer readable memory generate products including the instruction apparatus, the instruction apparatus achieves the functions specified in one or more flows in the flow charts and/or one or more blocks in the block diagrams.

These computer program instructions may also be loaded to a computer or other programmable data processing devices, such that a series of operational steps are performed on the computer or other programmable devices to generate a process to be implemented by the computer, thereby instructions executed on the computer or other programmable devices provide steps for achieving functions specified in one or more flows in the flow charts and/or one or more blocks in the block diagrams.

Specifically, the computer program instructions corresponding to the two methods for information processing in the embodiments of the application may be stored in storage mediums such as a compact disc, a hard disc, a USB disk.

The method for information processing provided by the embodiment shown in FIG. 1, when computer program instructions in the storage medium corresponding to the method for information processing are read or executed by an electronic apparatus, includes the following steps:

obtaining, in the case that the first application is run, a first control operation for the first application, the first control operation being used to instruct to establish a first group capable of including at least two participants;

during a process for establishing the first group in response to the first control operation, controlling the first wireless communication module to serve as a wireless access point and naming the wireless access point with parameter information for the first group, wherein a radiation signal is generated by the wireless access point such that the wireless access point may be scanned in the case that at least one second electronic apparatus is within coverage of the radiation signal;

establishing, after response information is obtained, a communication path directly connected to the at least one second electronic apparatus in a wireless link layer, wherein the response information is response information generated when the wireless access point is scanned and selected by the at least one second electronic apparatus within the coverage of the wireless access point; and obtaining, via the communication path, information indicating that the at least one second electronic apparatus to join the first group.

Optionally, computer instructions stored in the storage medium corresponding the step: controlling the first wireless communication module to serve as a wireless access point and naming the wireless access point with parameter information for the first group, wherein a radiation signal is generated by the wireless access point, when they are executed, may include the following steps:

controlling the first wireless communication module to serve as a WIFI hot spot and naming the WIFI hot spot with parameter information for the first group, a radiation signal is generated by the WIFI hot spot.

Optionally, the storage medium stores other computer instructions, these computer instructions are executed after computer instructions which correspond to the step that of obtaining, via the communication path, information indicating that the at least one second electronic apparatus joins the first group are executed, another computer instructions include the following steps:

cutting off the communication path and controlling the first wireless communication module to stop serving as the wireless access point in the case that the first application is stopped.

The method for information processing provided by the embodiment shown in FIG. 2, when computer instructions in the storage medium corresponding to the method for information processing are read or executed by an electronic apparatus, includes the following steps:

obtaining, in the case that the first application is run, a second control operation for the first application, the second control operation being used to instruct to scan at least one wireless access point named with parameter information of a group of the first application;

during a process for scanning the at least one wireless access point in response to the second control operation, controlling the second wireless communication module to receive a radiation signal, such that the at least one wireless access point may be scanned by the second electronic apparatus in the case that the second electronic apparatus is within coverage of a radiation signal sent from the at least one wireless access point;

displaying the scanned at least one wireless access point;

obtaining a selecting operation for selecting a first wireless access point from the at least one wireless access point, and generating and sending, in response to the selecting operation, response information to the first wireless access point, thus a communication path directly connected to the first electronic apparatus in a wireless link layer is established, the first electronic apparatus being a device by which the first wireless access point is established via establishing a first group for the first application; and joining, via the communication path, the first group.

Optionally, computer instructions stored in the storage medium corresponding to the step: displaying the scanned at least one wireless access point, when they are executed, may include the following step:

displaying parameter information of a group corresponding to the scanned at least one wireless access point.

Optionally, the storage medium also stores other computer instructions, these computer instructions are executed after computer instructions which correspond to the step of joining, via the communication path, the first group are executed, another computer instruction may include the following step:

cutting off the communication path and controlling the second wireless communication module to stop receiving a radiation signal when the first application is stopped.

Figure 5:
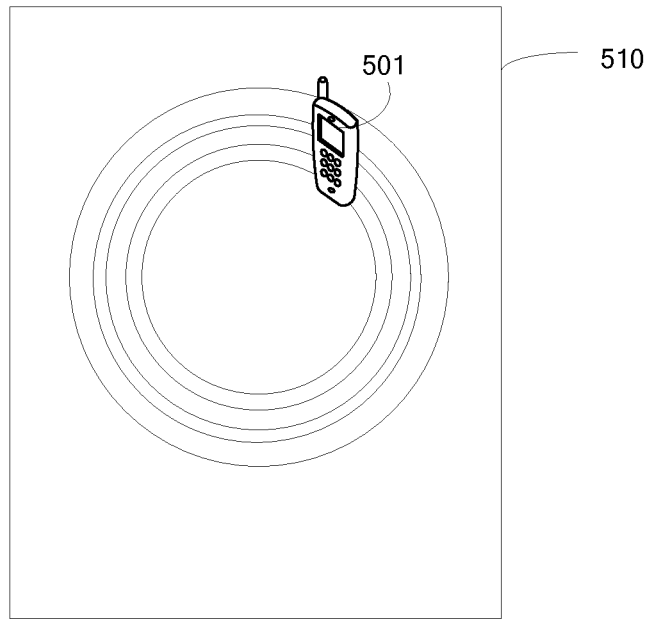
FIG. 5 is a display effect diagram of an embodiment of an electronic apparatus according to the disclosure.
Figure 6:
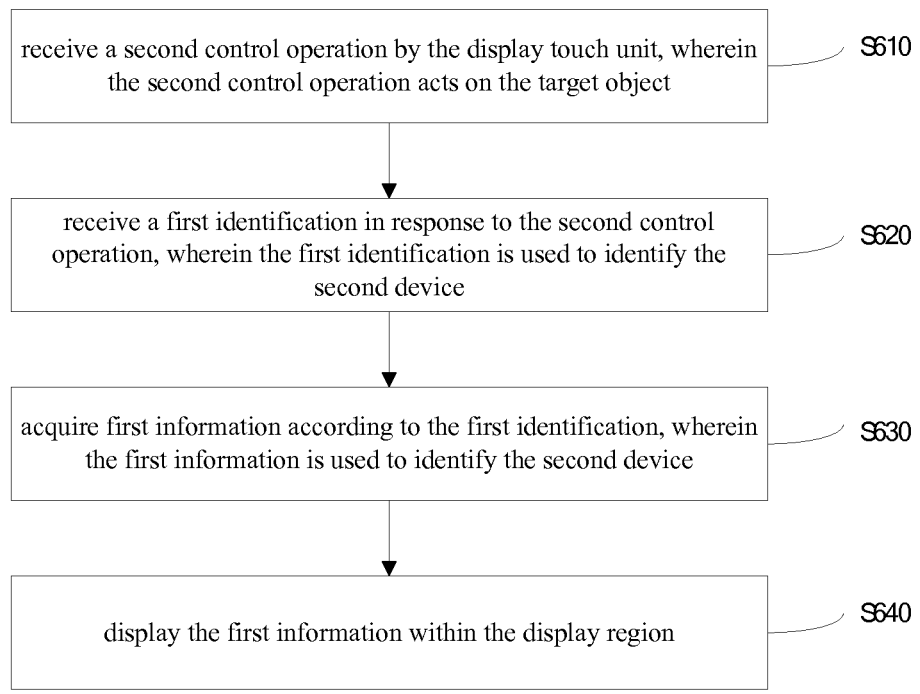
FIG. 6 is a schematic flow diagram of an embodiment of a method for information processing according to the disclosure.

An embodiment provides a method for information processing applied to a first electronic apparatus as shown in FIG. 5; the first electronic apparatus includes a display touch unit 510 including a display region; a first application may be run by the first electronic apparatus; and a target object 501 denoting a second electronic apparatus, which is one of the at least one second electronic apparatus, may be displayed on the display region when the first application is run by the first electronic apparatus; as shown in FIG. 6, the method for information processing includes:

step 610: receiving a second control operation by the display touch unit, wherein the second control operation is acted on the target object 501;

step 620: receiving a first identification in response to the second control operation, wherein the first identification is used to identify the second device;

step 630: acquiring first information according to the first identification, wherein the first information is used to identify the second device; and step 640: displaying the first information within the display region, wherein data amount of the first information is greater than data amount of the first identification.

The first application may be any application program applying the method described above, in particular, a short-distance data transmission application based on an environmental background sound match, such as the Any Share. The target object may be information such as a picture and/or a word denoting the second electronic apparatus and displayed in the first electronic apparatus.

In step S610, the second control operation may be various user operations such as a press operation, a slide operation or a click operation. The second electronic apparatus is specified by the target object, the first electronic apparatus is triggered by touching the target object by a user, and then information related to the second electronic apparatus is acquired. The first electronic apparatus may be a device such as a cell phone or a tablet, preferably, a mobile terminal having a touch display function.

In step 602, after the triggering of the second control operation, a first identification for identifying the second electronic apparatus is received by the first electronic apparatus; the first identification may be any one of identity identification information of the second electronic apparatus, such as an application serial number for uniquely identifying the second electronic apparatus.

In step 603, the first identification may be served as an index or a key word for querying the first information, so as to acquire the first information in a query way etc. The first information includes information such as a word and/or a picture. In order to reduce data transmission and speed up discovering and identifying, data amount of the first identification is generally very small such as 32 bit; and data amount of the first information will be greater than the data amount of the first identification, such as 100 k or 1024 k.

In the method for information processing described in the embodiment, the first information is acquired according to the first identification, and the data amount of the first information is greater than that of the first identification, so as the first information such as a picture with a high picture quality and/or clear words may be acquired by the user. In a specific embodiment, the first information may also be information such as an audio or video file according to needs of the user.

An embodiment provides a method for information processing applied to a first electronic apparatus as shown in FIG. 5; the first electronic apparatus includes a display touch unit 510 including a display region; a first application may be run by the first electronic apparatus; and the display region may display a target object 501 denoting a second electronic apparatus when the first application is run by the first electronic apparatus; as shown in FIG. 6, the method for information processing includes:

step 610: receiving a second control operation by the display touch unit, wherein the second control operation is acted on the target object 501;

step 620: receiving a first identification in response to the second control operation, wherein the first identification is used to identify the second device; the first identification is a communication number of the second electronic apparatus or a MAC address of the second electronic apparatus;

step 630: acquiring first information according to the first identification, wherein the first information is used to identify the second device; and step 640: displaying the first information within the display region, wherein data amount of the first information is greater than data amount of the first identification.

The first application may be any application program applying the method described above, in particular, a short-distance data transmission application based on an environmental background sound match, such as the Any Share.

The communication number is a number for identifying different electronic apparatus in a communication process of the electronic apparatus, therefore may be used to identify an electronic apparatus. The communication number is generally also stored in a storage medium installed on the electronic apparatus, and may be acquired from the electronic apparatus directly. Therefore, for the purpose of simplifying operation steps, the communication number is used to identify the second electronic apparatus. The MAC address (i.e. a Media Access Control address, or referred to as a MAC address, a hardware address) is used to define a position of a network device. A MAC address is generally used to uniquely identify an electronic apparatus, therefore, the MAC address may be used to identify the second electronic apparatus, and the MAC address has been set when equipment leaves factory, and stored in the electronic apparatus. Therefore, a way to acquire the MAC address is simple, so as to facilitate simplifying the operation.

In a specific implementation process, the communication number and the MAC address may also be replaced by information having an identification function such as a user account, an application serial number. If the method for information processing is applied to a short-distance transmission technology based on a sound match, one user account may be allocated to each user or each electronic apparatus when the transmission technology is applied. Apparently, the user account may also be served as the first identification for identifying the second electronic apparatus; there are multiple ways to realize the first identification, which are not described here any more.

From the above, the embodiment defines the first identification as the MAC address or the communication number based on the method embodiment shown in FIG. 6 described above. Universality and storage characteristics of the MAC address and the communication number facilitate simplifying the method for information processing of the embodiment, which makes the embodiment realized more easily.

An embodiment provides a method for information processing applied to a first electronic apparatus as shown in FIG. 5; the first electronic apparatus includes a display touch unit 510 including a display region; a first application may be run by the first electronic apparatus; and the display region may display a target object 501 denoting a second electronic apparatus when the first application is run by the first electronic apparatus; as shown in FIG. 6, the method for information processing includes:

step 610: receiving a second control operation by the display touch unit, wherein the second control operation is acted on the target object 501;

step 620: receiving a first identification in response to the second control operation, wherein the first identification is used to identify the second device;

step 630: acquiring first information according to the first identification, wherein the first information is used to identify the second device; and step 640: displaying the first information within the display region, wherein data amount of the first information is greater than data amount of the first identification; the first electronic apparatus includes a storage unit; the first information is stored in the storage unit in advance;

Step 630 includes: querying the first information in the storage unit according to the first identification.

For example, a first information corresponding to the second electronic apparatus is a picture b with a size of 2M; in the case where the picture b is stored in the network as the first identification, it is apparent that a time delay caused by acquiring the first information is by the user is large, and data traffic consumed is larger; however, only through the picture b the user may directly decide whether a user of the second electronic apparatus is a friend or a colleague who he or she want to look for. In order to solve the problem, the picture b is stored in the storage unit of the first electronic apparatus firstly in the embodiment, and in an actual application process, it is only required to download the first identification for identifying the second electronic apparatus from the network, and a query is performed on the picture b in the first electronic apparatus through the first identification; in this way, the large time delay due to the download may be avoided, while network congestion is avoided since the network traffic which is consumed is reduced, more importantly, user satisfaction is improved since the picture b which is required by the user is provided and a time delay caused by opening the picture b is reduced.

The first application in the embodiment may be any application program applying the method described above, particularly a short-distance data transmission application based on an environmental background sound match, such as the Any Share.

The embodiment is a further improvement based on the method embodiment shown in FIG. 6, it is further indicated based on the method embodiment shown in FIG. 6 that the first information is stored in the first electronic apparatus, a method for acquiring the first information is to query the first information according to the first identification, and the method has the following advantages: the method may be realized simply and the user satisfaction is high.

An embodiment provides a method for information processing applied to a first electronic apparatus as shown in FIG. 5; the first electronic apparatus includes a display touch unit 510 including a display region; a first application may be run by the first electronic apparatus; and the display region may display a target object 501 denoting a second electronic apparatus when the first application is run by the first electronic apparatus; as shown in FIG. 6, the method for information processing includes:

step 610: receiving a second control operation by the display touch unit, wherein the second control operation is acted on the target object 501;

step 620: receiving a first identification in response to the second control operation, wherein the first identification is used to identify the second device; the first identification is a communication number of the second electronic apparatus or a MAC address of the second electronic apparatus;

step 630: acquiring first information according to the first identification, wherein the first information is used to identify the second device; and step 640: displaying the first information within the display region, wherein data amount of the first information is greater than data amount of the first identification; the first electronic apparatus includes a storage unit; the first information is stored in the storage unit in advance, Step 630 further includes: querying the first information in the storage unit according to the first identification.

The embodiment is a further improvement based on the method embodiment shown in FIG. 6, it is further indicated based on the second method embodiment that the first information is stored in the first electronic apparatus, a method for acquiring the first information is to query the first information according to the first identification, and the method has the following advantages: the method may be realized simply and the user satisfaction is high.

An embodiment provides a method for information processing applied to a first electronic apparatus as shown in FIG. 5; the first electronic apparatus includes a display touch unit 510 including a display region; a first application may be run by the first electronic apparatus; and the display region may display a target object 501 denoting a second electronic apparatus when the first application is run by the first electronic apparatus; as shown in FIG. 6, the method for information processing includes:

step 610: receiving a second control operation by the display touch unit, wherein the second control operation is acted on the target object 501;

step 620: receiving a first identification in response to the second control operation, wherein the first identification is used to identify the second device;

step 630: acquiring first information according to the first identification, wherein the first information is used to identify the second device; and step 640: displaying the first information within the display region, wherein data amount of the first information is greater than data amount of the first identification, the first information is stored in a third electronic apparatus, Step 620 includes: acquiring the first information stored in the third electronic apparatus according to the first identification; the third electronic apparatus may be any one of network entities provided in a network such as a network server.

Step 620 may also be divided into the following three substeps:

first substep: transmitting the first identification to the third electronic apparatus through a communication interface by the second electronic apparatus;

second substep: querying the first information by the third electronic apparatus according to the first identification; and third substep: acquiring the first information from the third electronic apparatus by the first electronic apparatus.

The first electronic apparatus and the third electronic apparatus may be connected via a wireless network.

The embodiment provides a method about how to acquire the first information based on the method embodiment shown in FIG. 6, and the method may be realized easily.

An embodiment provides a method for information processing applied to a first electronic apparatus as shown in FIG. 5; the first electronic apparatus includes a display touch unit 510 including a display region; a first application may be run by the first electronic apparatus; and the display region may display a target object 501 denoting a second electronic apparatus when the first application is run by the first electronic apparatus; as shown in FIG. 6, the method for information processing includes:

step 610: receiving a second control operation by the display touch unit, wherein the second control operation is acted on the target object 501;

step 620: receiving a first identification in response to the second control operation, wherein the first identification is used to identify the second device; the first identification is a communication number of the second electronic apparatus or a MAC address of the second electronic apparatus;

step 630: acquiring first information according to the first identification, wherein the first information is used to identify the second device; and step 640: displaying the first information within the display region, wherein data amount of the first information is greater than data amount of the first identification; the first information is stored in a third electronic apparatus; step S620 includes: acquiring the first information queried by the third electronic apparatus according to the first identification.

The third electronic apparatus may be any one of network entities provided in a network such as a network server. The first identification is transmitted to the third electronic apparatus through a communication interface by the second electronic apparatus, the first information is queried by the third electronic apparatus according to the first identification, and then the first information is transmitted to the first electronic apparatus, so that the first information is acquired by the first electronic apparatus. The first electronic apparatus and the third electronic apparatus may be connected via a wireless network.

The embodiment provides a method about how to acquire the first information based on a method embodiment, and the method may be realized easily.

An embodiment provides a method for information processing applied to a first electronic apparatus as shown in FIG. 5; the first electronic apparatus includes a display touch unit 510 including a display region; a first application may be run by the first electronic apparatus; the first application may be a short-distance data transmission application based on an environmental background sound match, such as the Any Share; the display region may display a target object 501 denoting a second electronic apparatus when the first application is run by the first electronic apparatus; as shown in FIG. 6, the method for information processing includes:

step 610: receiving a second control operation by the display touch unit, wherein the second control operation is acted on the target object 501;

step 620: receiving a first identification in response to the second control operation, wherein the first identification is used to identify the second device;

step 630: acquiring first information according to the first identification, wherein the first information is used to identify the second device; and step 640: displaying the first information within the display region, wherein data amount of the first information is greater than data amount of the first identification, the first information is set by the first electronic apparatus or the second electronic apparatus.

In one embodiment of the disclosure, after step 640, the method further includes:

establishing a communication path connected to the at least one second electronic apparatus in a wireless link layer according to the first information. For example, the communication path connected to the at least one second electronic apparatus in the wireless link layer may be established by the user clicking on the first information.

In a specific application scenario, when a short-distance data transmission based on an environmental background sound match is performed between the first electronic apparatus and the second electronic apparatus, in order to make it convenient for a first user to quickly decide the second electronic apparatus and a second user corresponding to the second electronic apparatus through the first information, first information including a picture and/or a word may be defined to the second electronic apparatus by the first user, and when the short-distance data transmission based on an environmental background sound match is performed again, the second electronic apparatus and the second user may be identified accurately and quickly by the first user through the first information defined by his/her own.

Likewise, the identification thereof may be set by the second user through the second electronic apparatus, so that it is convenient to quickly identify the second electronic apparatus by other electronic apparatus when the short-distance data transmission based on an environmental background sound match is performed between the second electronic apparatus and the other electronic apparatus.

In a specific implementation process, the first information may also be set by a third electronic apparatus such as a network device, for example, the first information may be set by default, and the default setting may be changed by the first user and the second user through the first electronic apparatus or the second electronic apparatus.

The first information set by the first user and the second user may be stored in the first electronic apparatus, and may also be stored in the third electronic apparatus.

The embodiment is a further improvement based on the method embodiment show in FIG. 6, which further defines that the first information may be set by the first user and the second user through the first electronic apparatus and the second electronic apparatus, and improves control of the user.

An embodiment provides a method for information processing applied to a first electronic apparatus as shown in FIG. 5; the first electronic apparatus includes a display touch unit 510 including a display region; a first application may be run by the first electronic apparatus; and a target object 501 denoting a second electronic apparatus may be displayed on the display region when the first application is run by the first electronic apparatus; as shown in FIG. 6, the method for information processing includes:

step 610: receiving a second control operation by the display touch unit, wherein the second control operation is acted on the target object 501;

step 620: receiving a first identification in response to the second control operation, wherein the first identification is used to identify the second device; and the first identification is a communication number of the second electronic apparatus and a MAC address of the second electronic apparatus;

step 630: acquiring first information according to the first identification, wherein the first information is used to identify the second device; and step 640: displaying the first information within the display region, wherein data amount of the first information is greater than data amount of the first identification, the first information is set by the first electronic apparatus or the second electronic apparatus.

In a specific application scenario, when a short-distance data transmission based on an environmental background sound match is performed between the first electronic apparatus and the second electronic apparatus, in order to make it convenient for a first user to quickly decide the second electronic apparatus and a second user corresponding to the second electronic apparatus through the first information, first information including a picture and/or a word may be defined to the second electronic apparatus by the first user, and when the short-distance data transmission based on an environmental background sound match is performed again, the second electronic apparatus and the second user may be identified accurately and quickly by the first user through the first information defined by his/her own.

Likewise, the identification thereof may be set by the second user through the second electronic apparatus, so that it is convenient to quickly identify the second electronic apparatus by other electronic apparatus when the short-distance data transmission based on an environmental background sound match is performed between the second electronic apparatus and the other electronic apparatus.

In a specific implementation process, the first information may also be set by a third electronic apparatus such as a network device, for example, the first information may be set by default, and the default setting may be changed by the first user and the second user through the first electronic apparatus or the second electronic apparatus.

The first information set by the first user and the second user may be stored in the first electronic apparatus, and may also be stored in the third electronic apparatus.

The embodiment is a further improvement based on the method embodiment show in FIG. 6, which further defines that the first information may be set by the first user and the second user through the first electronic apparatus and the second electronic apparatus, and improves control of the user.

In a specific implementation process, any two method embodiments in the disclosure may be combined together in a case where there is no contradiction each other, so as to obtain more specific embodiments, which are not further described in detail here.

From the above, a method for information processing is provided in the embodiments described above, first, a first identification is downloaded, and then first information is acquired according to the first identification, in this way, a limit to a size of information amount stored in the network is avoided, more rich information amount may be obtained by the user, and user satisfaction is improved, meanwhile, a time delay of the network is not increased.

In a specific implementation process, the method for information processing is not limit to be applied to the short-distance data transmission based on an environmental background sound match, and may also be used to such as create a wireless hotpot or identify a network device.

In an application scenario for creating the wireless hotpot, a communication number and/or a custom nickname of the second electronic apparatus may be coded into a Service Set Identifier (SSID) of the wireless hotpot by the second electronic apparatus before steps S610 to S640 described above are performed. After the wireless hotspot is scanned by the first electronic apparatus, a first identification at least including the communication number is received through a second control operation, and first information is queried in the first electronic apparatus or the third electronic apparatus according to the first identification, i.e. the communication number. Specifically, for example, an address book of the first electronic apparatus or the third electronic apparatus may be queried according to the communication number. The first information may be information such as a contact person, a communication record and a picture of the contact person corresponding to the communication number.

In an application scenario for identifying the network device, a communication number, a MAC address and/or a custom nickname of the second electronic apparatus are broadcast in advance by the second electronic apparatus before steps S610 to S640 described above are performed. After the broadcast information is received by the first electronic apparatus, a first identification including at least one of the communication number and the MAC address is received through the second control operation, and then first information may be queried in the first electronic apparatus or the third electronic apparatus according to the first identification; the first information may be information such as a model number of the second device, an operator, a holder of the second device.

Figure 7:
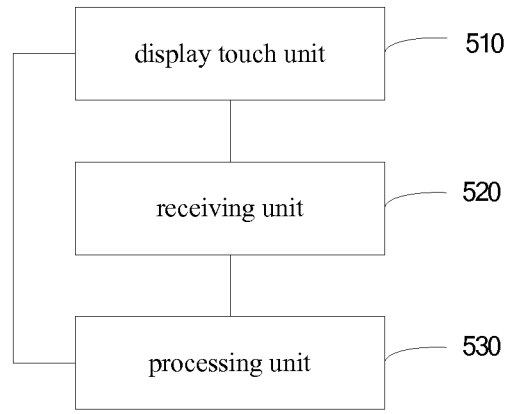
FIG. 7 is a schematic structural diagram of an embodiment of an electronic apparatus according to the disclosure.

As shown in FIG. 5 and FIG. 7, the embodiment provides an electronic apparatus, and the electronic apparatus is a first electronic apparatus; the first electronic apparatus includes a display touch unit 510, a processing unit 520 and a receiving unit 530; the display touch unit 510 includes a display region; a first application may be run by the processing unit 520, and a target object 501 denoting the second electronic apparatus, which is one of the at least one second electronic apparatus, may be displayed on the display region when the first application is run by the processing unit 520; the first application may be any of application programs applying the methods described above, particularly a short-distance data transmission application based on an environmental background sound match, such as the Any Share;

the display touch unit 510 is further configured to receive a second control operation, the second control operation is acted on the target object 501;

the receiving unit 520 is configured to receive a first identification based on the second control operation, the first identification is used to identify the second device;

the processing unit 530 is further configured to acquire first information according to the first identification, the first identification is used to identify the second device; and the display touch unit 510 is further configured to display the first information within the display region, wherein data amount of the first information is greater than data amount of the first identification. The first information includes information such as a word and/or a picture. In order to reduce data transmission and speed up discovering and identifying, data amount of the first identification is generally very small such as 32 bit; and data amount of the first information will be greater than the data amount of the first identification, such as 100 k or 1024 k.

In one embodiment of the disclosure, the processing unit 530 is further configured to establish a communication path connected to the at least one second electronic apparatus in a wireless link layer according to the first information.

The first electronic apparatus may be any electronic apparatus which may perform a short-distance data transmission based on an environmental background sound match, optionally, the first electronic apparatus is a mobile terminal including a smart phone, a tablet computer and so on. The first electronic apparatus and the second electronic apparatus perform data transmission based on a short-distance wireless technology.

A physical structure of the display touch unit 510 may include a touch screen; the touch screen may be a liquid crystal touch screen, an organic light emitting diode (OLED) touch screen, and touch operations such as a click operation, a slide operation and a press operation at a user input may be received by the touch screen; the second control operation is any one of touch operations.

A physical structure of the receiving unit 520 may include a communication interface; the communication interface may be a receiver antenna and so on.

A physical structure of he processing unit 530 may include an electronic component including a processor, an integrated circuit having a function for acquiring the first information and so on. The processor may be a single-core or multi-core central processor, a single-chip microcomputer, various kinds of programmable logic array or the like. The processing unit is connected to the receiving unit 520 and the display touch unit 510 respectively via a transmission bus. In a specific implementation, the structures of the processing unit 530 vary from the method to the method for acquiring the first information.

The electronic apparatus described by the embodiment provides a hardware support to the method for information processing in the first method embodiment, and may be used to realize the technical solution in the embodiment shown in FIG. 6. The first identification is received by the receiving unit 520, and then the first information is acquired by the processing unit 530 according to the first identification, so as to acquire the first information such as a picture having a high picture quality and/or a clear word, and provide more high-quality service to the user and improve the user satisfaction. In a specific implementation process, the first information may also be information such as audio or video information according to needs of the user.

As shown in FIG. 5 and FIG. 7, the embodiment provides an electronic apparatus, and the electronic apparatus is a first electronic apparatus; the first electronic apparatus includes a display touch unit 510, a processing unit 520 and a receiving unit 530; the display touch unit 510 includes a display region; a first application may be run by the processing unit 520, and a target object 501 denoting the second electronic apparatus may be displayed on the display region when the first application is run by the processing unit 520; the first application may be a short-distance data transmission application based on an environmental background sound match, such as the Any Share;

the display touch unit 510 is further configured to receive a second control operation, the second control operation is acted on the target object 501;

the receiving unit 520 is configured to receive a first identification based on the second control operation, the first identification is used to identify the second device, wherein the first identification is a communication number of the second electronic apparatus or a MAC address of the second electronic apparatus;

the processing unit 530 is further configured to acquire first information according to the first identification, the first identification is used to identify the second device; and the display touch unit 510 is further configured to display the first information within the display region, wherein data amount of the first information is greater than data amount of the first identification. The first information includes information such as a word and/or a picture. In order to reduce data transmission and speed up discovering and identifying, data amount of the first identification is generally very small such as 32 bit; and data amount of the first information will be greater than the data amount of the first identification, such as 100 k or 1024 k.

The communication number is a number for identifying different electronic apparatus in a communication process of the electronic apparatus, therefore may be used to identify an electronic apparatus. The communication number is generally also stored in a storage medium installed on the electronic apparatus, and may be acquired from the electronic apparatus directly. Therefore, for the purpose of simplifying operation steps, the communication number is used to identify the second electronic apparatus. The MAC address (i.e. a Media Access Control address, or referred to as a MAC address, a hardware address) is used to define a position of a network device. An electronic apparatus generally corresponds to a unique MAC address, therefore, the MAC address may be used to identify the second electronic apparatus, and the MAC address has been set when equipment leaves factory, and stored in the electronic apparatus. Therefore, a way to acquire the MAC address is simple, so as to facilitate simplifying the operation.

The electronic apparatus described in the embodiment provides a hardware support to the method for information processing described method embodiment, and may be used to realize any technical solution in the a embodiment. The first identification is received by the receiving unit 520, and then the first information is acquired by the processing unit 530 according to the first identification, so as to acquire the first information such as a picture having a high picture quality and/or a clear word, and provide more high-quality service to the user and improve the user satisfaction.

Figure 8:
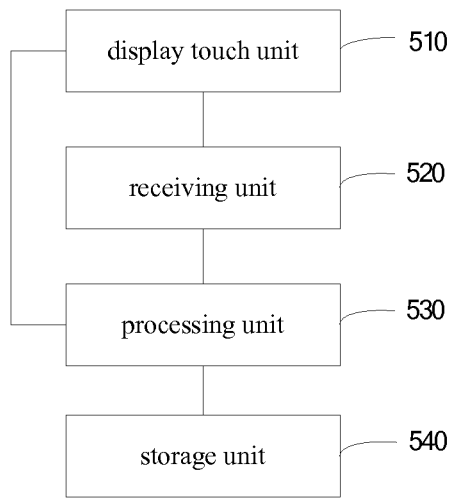
FIG. 8 is a schematic structural diagram of an embodiment of an electronic apparatus according to the disclosure.

As shown in FIG. 5 and FIG. 8, the embodiment provides an electronic apparatus, and the electronic apparatus is a first electronic apparatus; the first electronic apparatus includes a display touch unit 510, a processing unit 520 and a receiving unit 530; the display touch unit 510 includes a display region; a first application may be run by the processing unit 520, and the display region may display a target object 501 denoting the second electronic apparatus when the first application is run by the processing unit 520; the first application may be a short-distance data transmission application based on an environmental background sound match, such as the Any Share;

the display touch unit 510 is further configured to receive a second control operation, the second control operation is acted on the target object 501;

the receiving unit 520 is configured to receive a first identification based on the second control operation, the first identification is used to identify the second device;

the processing unit 530 is further configured to acquire first information according to the first identification, the first identification is used to identify the second device; and the display touch unit 510 is further configured to display the first information within the display region, wherein data amount of the first information is greater than data amount of the first identification.

The first electronic apparatus includes a storage unit 540;

the storage unit 540 is configured to store the first information in advance;

the processing unit 520 is configured to query the first information in the storage unit according to the first identification.

In a specific implementation process, the first electronic apparatus further includes a storage unit; the storage unit may include an instant storage medium and a non-instant storage medium. The instant storage medium may include a storage medium such as a RAM and a flash which will lose data when power off and used to temporarily store data of the first electronic apparatus, particularly for example a cache. The non-instant storage medium may include a ROM and be used to store the data for a long time, and the MAC address and the communication number of the second electronic apparatus are preferably stored in the non-instant storage medium. Specifically, the storage unit may be integrated into the first electronic apparatus, and may also be a storage unit bought and installed in the electronic apparatus by the user.

A first information for identifying the second electronic apparatus is stored in advance by the storage unit 540; specifically, a map relationship table between the second electronic apparatus and the first information is stored in the storage unit 540. In any one of the embodiments of the disclosure, the second electronic apparatus may be considered as any device which may perform a short-distance data transmission based on an environmental background sound match with the first electronic apparatus. The map relationship table between several second electronic apparatus and first information corresponding thereto may be stored in the storage unit 540.

In the embodiment, the first information is preferably stored in the non-instant storage medium. The storage unit 540 is connected to the processing unit 520 through a communication interface or a bus. The bus includes a data bus and an address bus.

The electronic apparatus described by the embodiment provides a hardware support to the method for information processing described in a method embodiment, and may be used to realize the technical solution described an embodiment. The first identification is received by the receiving unit 520, and then the first information is acquired by the processing unit 530 according to the first identification, so as to acquire the first information such as a picture having a high picture quality and/or a clear word, and provide more high-quality service to the user and improve user satisfaction.

As shown in FIG. 5 and FIG. 8, the embodiment provides an electronic apparatus, and the electronic apparatus is a first electronic apparatus; the first electronic apparatus includes a display touch unit 510, a processing unit 520 and a receiving unit 530; the display touch unit 510 includes a display region; a first application may be run by the processing unit 520, and the display region may display a target object 501 denoting the second electronic apparatus when the first application is run by the processing unit 520; the first application may be a short-distance data transmission application based on an environmental background sound match, such as the Any Share;

the display touch unit 510 is further configured to receive a second control operation, the second control operation is acted on the target object 501;

the receiving unit 520 is configured to receive a first identification based on the second control operation, the first identification is used to identify the second device;

the processing unit 530 is further configured to acquire first information according to the first identification, the first identification is used to identify the second device; and the display touch unit 510 is further configured to display the first information within the display region, wherein data amount of the first information is greater than data amount of the first identification. The first information includes information such as a word and/or a picture. In order to reduce data transmission and speed up discovering and identifying, data amount of the first identification is generally very small such as 32 bit; and data amount of the first information will be greater than the data amount of the first identification, such as 100 k or 1024 k.

The first electronic apparatus includes a storage unit 540;

the storage unit 540 is configured to store the first information in advance;

the processing unit 520 is configured to query the first information in the storage unit according to the first identification.

In a specific implementation process, the first electronic apparatus further includes a storage unit; the storage unit may include an instant storage medium and a non-instant storage medium. The instant storage medium may include a storage medium such as a RAM and a flash which will lose data when power off and used to temporarily store data of the first electronic apparatus, particularly for example a cache. The non-instant storage medium may include a ROM and be used to store the data for a long time, and the MAC address and the communication number of the second electronic apparatus are preferably stored in the non-instant storage medium. Specifically, the storage unit may be integrated into the first electronic apparatus, and may also be a storage unit bought and installed in the electronic apparatus by the user.

A first information for identifying the second electronic apparatus is stored in advance by the storage unit 540; specifically, a map relationship table between the second electronic apparatus and the first information is stored in the storage unit 540. In any one of the embodiments of the disclosure, the second electronic apparatus may be considered as any device which may perform a short-distance data transmission based on an environmental background sound match with the first electronic apparatus. The map relationship table between several second electronic apparatus and first information corresponding thereto may be stored in the storage unit 540.

In the embodiment, the first information is preferably stored in the non-instant storage medium. The storage unit 540 is connected to the processing unit 520 through a communication interface or a bus. The bus includes a data bus and an address bus.

The electronic apparatus described by the embodiment provides a hardware support to the method for information processing described in a method embodiment, and may be used to realize the technical solution described an embodiment. The first identification is received by the receiving unit 520, and then the first information is acquired by the processing unit 530 according to the first identification, so as to acquire the first information such as a picture having a high picture quality and/or a clear word, and provide more high-quality service to the user and improve user satisfaction.

As shown in FIG. 5 and FIG. 7, the embodiment provides an electronic apparatus, and the electronic apparatus is a first electronic apparatus; the first electronic apparatus includes a display touch unit 510, a processing unit 520 and a receiving unit 530; the display touch unit 510 includes a display region; a first application may be run by the processing unit 520, and a target object 501 denoting the second electronic apparatus may be displayed on the display region when the first application is run by the processing unit 520; the first application may be a short-distance data transmission application based on an environmental background sound match, such as the Any Share;

the display touch unit 510 is further configured to receive a second control operation, the second control operation is acted on the target object 501;

the receiving unit 520 is configured to receive a first identification based on the second control operation, the first identification is used to identify the second device;

the processing unit 530 is further configured to acquire first information according to the first identification, the first identification is used to identify the second device; and the display touch unit 510 is further configured to display the first information within the display region, wherein data amount of the first information is greater than data amount of the first identification.

The first information is stored in a third electronic apparatus, the processing unit 520 is configured to acquire the first information stored in the third electronic apparatus according to the first identification.

The third electronic apparatus may be an electronic apparatus having a storage function such as a network device, and is connected to the first electronic apparatus via a wire network or a wireless network.

In the embodiment, the processing unit 530 is configured to generate an instruction generating module for transmitting an instruction and a transceiver module. The instruction generating module is connected to the transceiver module via a transmission bus.

The transceiver module is controlled by the transmitted instruction to transmit the first identification to the third electronic apparatus; the transceiver module is further configured to receive the first information transmitted by the third electronic apparatus. The first information is queried by the third electronic apparatus according to the first identification.

A specific structure of the transceiver module may be a communication interface with a transceiver function, such as a transceiver antenna. In a specific implementation process, the transceiver module may reuse the same communication interface with the transmission unit.

Likewise, a hardware structure corresponding to the instruction generating module may be a processor, and the processor is configured to generate a transmission instruction base on the first identification. The processor may be any one component with an instruction generating function of a single-core or a multi-core central processor, a single-chip microcomputer, a digital signal processor and a programmable logic array.

The embodiment is a further improvement based on the electronic apparatus described in the embodiment shown in FIG. 7, and provides hardware support to the method for information processing described in the a method embodiment, and may realize a method for information processing described in the method embodiment, and has the following advantages: the user satisfaction is high and the embodiment is realized easily.

As shown in FIG. 5 and FIG. 7, the embodiment provides an electronic apparatus, and the electronic apparatus is a first electronic apparatus; the first electronic apparatus includes a display touch unit 510, a processing unit 520 and a receiving unit 530; the display touch unit 510 includes a display region; a first application may be run by the processing unit 520, and a target object 501 denoting the second electronic apparatus may be displayed on the display region when the first application is run by the processing unit 520; the first application may be a short-distance data transmission application based on an environmental background sound match, such as the Any Share;

the display touch unit 510 is further configured to receive a second control operation, the second control operation is acted on the target object 501;

the receiving unit 520 is configured to receive a first identification based on the second control operation, the first identification is used to identify the second device; wherein the first identification is a communication number of the second electronic apparatus or a MAC address of the second electronic apparatus;

the processing unit 530 is further configured to acquire first information according to the first identification, the first identification is used to identify the second device; and the display touch unit 510 is further configured to display the first information within the display region, wherein data amount of the first information is greater than data amount of the first identification. The first information includes information such as a word and/or a picture. In order to reduce data transmission and speed up discovering and identifying, data amount of the first identification is generally very small such as 32 bit; and data amount of the first information will be greater than the data amount of the first identification, such as 100 k or 1024 k.

The first information is stored in a third electronic apparatus, the processing unit 520 is configured to acquire the first information stored in the third electronic apparatus according to the first identification.

The third electronic apparatus may be an electronic apparatus having a storage function such as a network device, and is connected to the first electronic apparatus via a wire network or a wireless network.

In the embodiment, the processing unit 530 is configured to generate an instruction generating module for transmitting an instruction and a transceiver module. The instruction generating module is connected to the transceiver module via a transmission bus.

The transceiver module is controlled by the transmitted instruction to transmit the first identification to the third electronic apparatus; the transceiver module is further configured to receive the first information transmitted by the third electronic apparatus. The first information is queried by the third electronic apparatus according to the first identification.

A specific structure of the transceiver module may be a communication interface with a transceiver function, such as a transceiver antenna. In a specific implementation process, the transceiver module may reuse the same communication interface with the transmission unit.

Likewise, a hardware structure corresponding to the instruction generating module may be a processor, and the processor is configured to generate a transmission instruction base on the first identification. The processor may be any one component with an instruction generating function of a single-core or a multi-core central processor, a single-chip microcomputer, a digital signal processor and a programmable logic array.

The embodiment is a further improvement based on the electronic apparatus described in the embodiment shown in FIG. 7, and provides hardware support to the method for information processing described in the a method embodiment, and may realize a method for information processing described in the method embodiment, and has the following advantages: the user satisfaction is high and the embodiment is realized easily.

As shown in FIG. 5 and FIG. 7, the embodiment provides an electronic apparatus, and the electronic apparatus is a first electronic apparatus; the first electronic apparatus includes a display touch unit 510, a processing unit 520 and a receiving unit 530; the display touch unit 510 includes a display region; a first application may be run by the processing unit 520, and a target object 501 denoting the second electronic apparatus may be displayed on the display region when the first application is run by the processing unit 520; the first application may be a short-distance data transmission application based on an environmental background sound match, such as the Any Share;

the display touch unit 510 is further configured to receive a second control operation, the second control operation is acted on the target object 501;

the receiving unit 520 is configured to receive a first identification based on the second control operation, the first identification is used to identify the second device;

the processing unit 530 is further configured to acquire first information according to the first identification, the first identification is used to identify the second device; and the display touch unit 510 is further configured to display the first information within the display region, wherein data amount of the first information is greater than data amount of the first identification. The first information includes information such as a word and/or a picture. In order to reduce data transmission and speed up discovering and identifying, data amount of the first identification is generally very small such as 32 bit; and data amount of the first information will be greater than the data amount of the first identification, such as 100 k or 1024 k.

The first information is set by the first electronic apparatus or the second electronic apparatus.

In a specific application scenario, when a short-distance data transmission based on an environmental background sound match is performed between the first electronic apparatus and the second electronic apparatus, in order to make it convenient for a first user to quickly decide the second electronic apparatus and a second user corresponding to the second electronic apparatus through the first information, first information including a picture and/or a word may be defined to the second electronic apparatus by the first user, and when the short-distance data transmission based on an environmental background sound match is performed again, the second electronic apparatus and the second user may be identified accurately and quickly by the first user through the first information defined by his/her own.

Likewise, the identification thereof may be set by the second user through the second electronic apparatus, so that it is convenient to quickly identify the second electronic apparatus by other electronic apparatus when the short-distance data transmission based on an environmental background sound match is performed between the second electronic apparatus and the other electronic apparatus.

In a specific implementation process, the first information may also be set by a third electronic apparatus such as a network device, for example, the first information may be set by default, and the default setting may be changed by the first user and the second user through the first electronic apparatus or the second electronic apparatus.

The first information set by the first user and the second user may be stored in the first electronic apparatus, and may also be stored in the third electronic apparatus.

The embodiment is a further improvement based on the embodiment shown in FIG. 7, and provides specific hardware support to a method embodiment, and further defines that the first information may be set by the first user and the second user through the first electronic apparatus and the second electronic apparatus, and improves control of the user.

As shown in FIG. 5 and FIG. 7, the embodiment provides an electronic apparatus, and the electronic apparatus is a first electronic apparatus; the first electronic apparatus includes a display touch unit 510, a processing unit 520 and a receiving unit 530; the display touch unit 510 includes a display region; a first application may be run by the processing unit 520, and a target object 501 denoting the second electronic apparatus may be displayed on the display region when the first application is run by the processing unit 520; the first application may be a short-distance data transmission application based on an environmental background sound match, such as the Any Share;

the display touch unit 510 is further configured to receive a second control operation, the second control operation is acted on the target object 501;

the receiving unit 520 is configured to receive a first identification based on the second control operation, the first identification is used to identify the second device, wherein the first identification is a communication number of the second electronic apparatus or a MAC address of the second electronic apparatus;

the processing unit 530 is further configured to acquire first information according to the first identification, the first identification is used to identify the second device; and the display touch unit 510 is further configured to display the first information within the display region, wherein data amount of the first information is greater than data amount of the first identification. The first information includes information such as a word and/or a picture. In order to reduce data transmission and speed up discovering and identifying, data amount of the first identification is generally very small such as 32 bit; and data amount of the first information will be greater than the data amount of the first identification, such as 100 k or 1024 k.

The communication number is a number for identifying different electronic apparatus in a communication process of the electronic apparatus, therefore may be used to identify an electronic apparatus. The communication number is generally also stored in a storage medium installed on the electronic apparatus, and may be acquired from the electronic apparatus directly. Therefore, for the purpose of simplifying operation steps, the communication number is used to identify the second electronic apparatus. The MAC address (i.e. a Media Access Control address, or referred to as a MAC address, a hardware address) is used to define a position of a network device. An electronic apparatus generally corresponds to a unique MAC address, therefore, the MAC address may be used to identify the second electronic apparatus, and the MAC address has been set when equipment leaves factory, and stored in the electronic apparatus. Therefore, a way to acquire the MAC address is simple, so as to facilitate simplifying the operation.

In a specific application scenario, when a short-distance data transmission based on an environmental background sound match is performed between the first electronic apparatus and the second electronic apparatus, in order to make it convenient for a first user to quickly decide the second electronic apparatus and a second user corresponding to the second electronic apparatus through the first information, first information including a picture and/or a word may be defined to the second electronic apparatus by the first user, and when the short-distance data transmission based on an environmental background sound match is performed again, the second electronic apparatus and the second user may be identified accurately and quickly by the first user through the first information defined by his/her own.

Likewise, the identification thereof may be set by the second user through the second electronic apparatus, so that it is convenient to quickly identify the second electronic apparatus by other electronic apparatus when the short-distance data transmission based on an environmental background sound match is performed between the second electronic apparatus and the other electronic apparatus.

In a specific implementation process, the first information may also be set by a third electronic apparatus such as a network device, for example, the first information may be set by default, and the default setting may be changed by the first user and the second user through the first electronic apparatus or the second electronic apparatus.

The first information set by the first user and the second user may be stored in the first electronic apparatus, and may also be stored in the third electronic apparatus.

The embodiment is a further improvement based on the device embodiment shown in FIG. 7, and provides specific hardware support to the a method embodiment, and further defines that the first information may be set by the first user and the second user through the first electronic apparatus and the second electronic apparatus, and improves control of the user.

A method for information processing applied to a first electronic apparatus, wherein the first electronic apparatus includes a first wireless communication module and a display module, the first electronic apparatus may obtain a first application and N generic applications, N is a positive integer, and after the first electronic apparatus has the first application and in a case where the first wireless communication module is in a working state, the method includes:

acquiring and displaying a first controls when the first application is run;

receiving a first triggering operation for the first controls, and in response to the received triggering operation, controlling the first wireless communication module to scan to obtain K wireless access points, the K wireless access points having a one-to-one correspondence with K display identifiers, K is a positive integer, here, the K wireless access points correspond to at least one second electronic apparatus.

displaying the K display identifiers by the display module;

obtaining a second control operation for selecting a first display identifier from the K display identifiers; and establishing, in response to the second control operation, a communication path directly connected to a first wireless access point corresponding to the first display identifier in a wireless link layer, and starting, based on the first display identifier, a first generic application of the N generic applications that corresponds to the first display identifier so as to run the first generic application.

As illustrated, when a first application is run, K display identifiers corresponding to K wireless access points obtained by scanning are displayed; and in a case where a user determines to select a first display identifier, a communication path to a first wireless access point corresponding to the first display identifier is established, and a first generic application corresponding to the first display identifier is started, so as to achieve a technical effect that in a case where there is no external network, the electronic apparatus can automatically start an application corresponding to a display identifier for a wireless access point when establishing a connection with the wireless access point obtained by scanning, thereby reducing operation complexity.

To better understand the technical solution described above, the above technical solution will be illustrated in detail hereinafter in conjunction with accompanying drawings and specific embodiments.

A method for information processing applied to a first electronic apparatus, wherein the first electronic apparatus includes a first wireless communication module and a display module, the first electronic apparatus may obtain a first application and N generic applications, N is a positive integer. The first electronic apparatus may be a smart phone, a notebook computer, a tablet computer, a desktop computer and other electronic apparatus, which is not enumerated in the embodiment.

Figure 9:
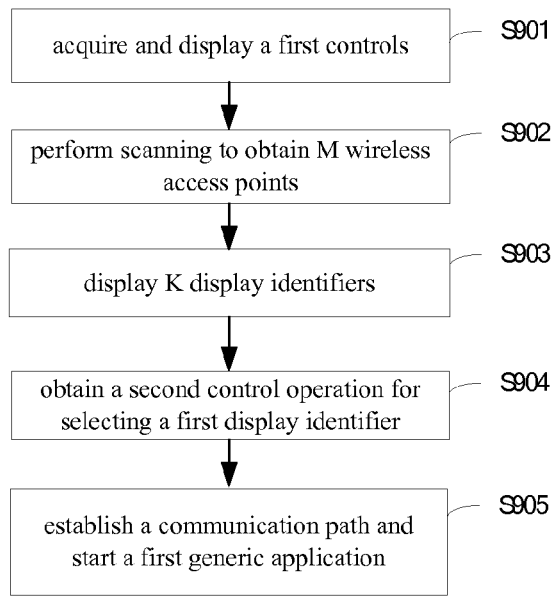
FIG. 9 is a flow chart of a method for information processing according to an embodiment of the disclosure.

Reference is made to FIG. 9 which is a flow chart of a method for information processing according to an embodiment of the disclosure. After the first electronic apparatus has the first application and in a case where the first wireless communication module is in a working state, the method includes steps S901 to S905:

step S901, acquiring and displaying a first controls when the first application is run;

step S902, receiving a first triggering operation for the first controls, and in response to the received triggering operation, controlling the first wireless communication module to scan to obtain K wireless access points, the K wireless access points having a one-to-one correspondence with K display identifiers, K is a positive integer;

step S903, displaying the K display identifiers by the display module;

step S904, obtaining a second control operation for selecting a first display identifier from the K display identifiers; and step S905, establishing, in response to the second control operation, a communication path directly connected to a first wireless access point corresponding to the first display identifier in a wireless link layer, and starting, based on the first display identifier, a first generic application of the N generic applications that corresponds to the first display identifier so as to run the first generic application.

In practice, the wireless access point may be a wireless access point established by an electronic apparatus (such as a smart phone, a notebook computer, a tablet computer and a desktop computer, just to name a few) using a second wireless communication module therein.

In a specific implementation process, the first application is an application that can be used for data transmission and establishing a network connection. The N generic applications are game applications. A user may utilize the first application to call other game applications to play a game.

First, in step S901, a first controls is acquired and displayed when the first application is run.

In a specific implementation process, the first controls is a controls preset in the first application, and when the first application is run, the first controls may be displayed in the form of a touch button or a touch icon in an application interface for the first application.

After the first controls is displayed in step S901, step S902 is performed, that is, a first triggering operation acted on the first controls is received, and in response to the received triggering operation, the first wireless communication module is controlled to scan to obtain K wireless access points, the K wireless access points having a one-to-one correspondence with K display identifiers, K is a positive integer.

In the embodiment of the disclosure, the wireless access point may be a WIFI hot spot. In a case where the wireless access point is set as a WIFI hot spot, a condition that connections with the wireless access point is established simultaneously by more than two electronic apparatus may be satisfied.

For how wireless access points are scanned by the first electronic apparatus without coverage of external network, it is illustrated in detail in the following.

In a case where the first electronic apparatus is not covered by external network, the first wireless communication module in the first electronic apparatus still has a function of sending and receiving a signal due to its hardware construction. When the first application is run, the first application controls the first wireless communication module in the first electronic apparatus to enable the function of sending and receiving a signal thereof, and then the first wireless communication module continuously to receive radiation signals sent by a wireless access point within a specific range. At this time, in the case where a second electronic apparatus is located in the range within which the first electronic apparatus may receive a signal and in a case where a second wireless communication module of the second electronic apparatus is set as a second wireless access point, the second communication module also enable the function of sending and receiving a signal and sends a radiation signal. Then, the second wireless access point established by the second electronic apparatus is scanned by the first electronic apparatus when the first wireless communication module in the first electronic apparatus receives the radiation signal.

In the embodiment of the disclosure, in order to solve a technical problem that the user cannot conveniently perform a select operation since there are too many wireless access points scanned by the first wireless communication module, controlling the first wireless communication module to scan to obtain K wireless access points includes:

controlling the first wireless communication module to scan to obtain M wireless access points, M≥K; and performing filtering, based on M display identifiers having a one-to-one correspondence with the M wireless access points, to obtain K wireless access points that satisfy a first preset condition of the M wireless access points.

For how to set the first preset condition, it will be illustrated in detail hereinafter from a case that the first electronic apparatus is not connected to a server and a case that the first electronic apparatus is connected to the server respectively.

In the first case, the first electronic apparatus is not connected to the server.

At this point, the first preset condition may be that:

a display identifier corresponding to the wireless access point is a display identifier corresponding to the genetic application which the first electronic apparatus already has.

That is, filtering is performed to obtain K wireless access points of the M wireless access points, with the display identifiers corresponding to the K wireless access points being display identifiers corresponding to the generic applications which the first electronic apparatus already has.

In a specific implementation process, each wireless access point obtained by scanning of the first electronic apparatus has a display identifier. The display identifier may be a name of the wireless access point, and is generated according to parameter information of the generic application that controls the wireless access point to be established.

For example, in a case where one second wireless access point is a wireless access point established by a second electronic apparatus under the control of a second generic application, the second wireless access point is named after parameter information of the second generic application and the name of the second wireless access point is used as a second display identifier corresponding to the second wireless access point, so that when the second wireless access point is scanned by the first electronic apparatus, the second generic application may be identified by the first electronic apparatus according to the second display identifier for the second wireless access point. If the first electronic apparatus has the second generic application, the second wireless access point is obtained by filtering as one of the K wireless access points.

Further, performing filtering to obtain K wireless access points may include:

acquiring M display identifiers having a one-to-one correspondence with M wireless access points;

performing filtering to obtain K display identifiers of the M display identifiers that correspond to the parameter information of the genetic applications which the first electronic apparatus already has; and obtaining K wireless access points corresponding to the K display identifiers.

Specifically, a wireless access point is displayed only if a display identifier corresponding to the wireless access point is a display identifier corresponding to a genetic application which the first electronic apparatus already has, so as to achieve a technical effect that the generic application corresponding to the displayed display identifier can be directly started on the first electronic apparatus without installation.

In the second case, the first electronic apparatus is connected with the server.

At this point, the first preset condition is that:

a display identifier corresponding to the wireless access point is a display identifier corresponding to a genetic application within a first preset list, with the generic application within the first preset list being a generic application stored in the server.

That is, there are a large number of generic applications pre-stored in a server connected with the first electronic apparatus, therefore, there is a need to perform filtering to obtain K wireless access points from the M wireless access points, with display identifiers corresponding to the K wireless access points are display identifiers corresponding to the parameter information of generic applications stored in the server.

For example, a generic application named "Application A" is stored in the server. In a case where a display identifier for the first wireless access point of the M wireless access points is "Application A 1", it is considered that the display identifier for the first wireless access point is the display identifier corresponding to the generic application named "Application A", therefore, the first wireless access point is obtained by performing filtering as one of the K wireless access points.

Further, performing filtering to obtain K wireless access points may include:

acquiring M display identifiers having a one-to-one correspondence with M wireless access points;

performing filtering to obtain K display identifiers of the M display identifiers that correspond to parameter information of genetic applications stored in the server; and obtaining K wireless access points corresponding to the K display identifiers.

Specifically, in a case where the first electronic apparatus is connected with the server, a wireless access point is displayed only if a display identifier corresponding to the wireless access point is a display identifier corresponding to a genetic application stored in the server, so as to achieve a technical effect that all installation files for applications corresponding to the displayed display identifiers can be acquired from the server.

Of course, the first preset condition for performing filtering to obtain K wireless access points may not only be the two fixed conditions described above, but also may be preset flexibly by the user as required in the first application which the first electronic apparatus has.

In addition to the above two methods for setting the first preset condition, the embodiment of the disclosure further provides a third alternative and a fourth alternative for setting the first preset condition in the following.

In the third alternative, it is considered that the first generic application may be a game application. The game application often has a default restricted number of players, for example, 3 players are allowed to participate in a game "Fight the Landlord" by default.

At this point, the first preset condition is that:

the first number of connections for electronic apparatus which are already connected to the wireless access point is less than the default maximum number of connections for a genetic application corresponding to the wireless access point.

For example, there is a wireless access point named "Fight the Landlord" among the M wireless access points scanned by the first electronic apparatus, and the default number of players for the generic application corresponding to "Fight the Landlord" is 3. In addition to a second electronic apparatus establishing the wireless access point named "Fight the Landlord", two electronic apparatus are still allowed to participate in the generic application of "Fight the Landlord", therefore, the default maximum number of connections for the generic application of "Fight the Landlord" is 2.

If the number of the electronic apparatus which has been connected to the wireless access point named "Fight the Landlord" is 2, which is equal to the maximum number of connections for the generic application of "Fight the Landlord", then the first electronic apparatus does not display the wireless access point named "Fight the Landlord".

The first electronic apparatus may acquire the first number of connections by: adding 1 to a counter within the second electronic apparatus whenever one electronic apparatus connects to the first wireless access point created by the second electronic apparatus; and adding the first number of connections for the connected electronic apparatus into the first display identifier corresponding to the first wireless access point, so that the first electronic apparatus may acquire the first number of connections according to the scanned first display identifier.

The first electronic apparatus may acquire the maximum number of connections by: adding the default maximum number of connections for the corresponding generic application into the first display identifier corresponding to a first wireless access point when the second electronic apparatus establishes the first wireless access point, so that the first electronic apparatus may acquire the maximum number of connections according to the scanned first display identifier.

In the fourth alternative, the first preset condition is that:

one first label is included in a display identifier corresponding to a wireless access point, with the first label being used to indicate that the wireless access point is a wireless access point created through the first application.

Specifically, the first electronic apparatus is set to display only a wireless access point the display identifier of which includes the first label, so that all of the displayed wireless access points are wireless access points created by other electronic apparatus through the first application, thereby avoiding displaying a large number of useless wireless access points, and facilitating the user to quickly select a wireless access point applicable for connection with the first application.

After the K wireless access points are obtained in step S102, the method proceeds to step S903, the K display identifiers are displayed by the display module.

Figure 10:
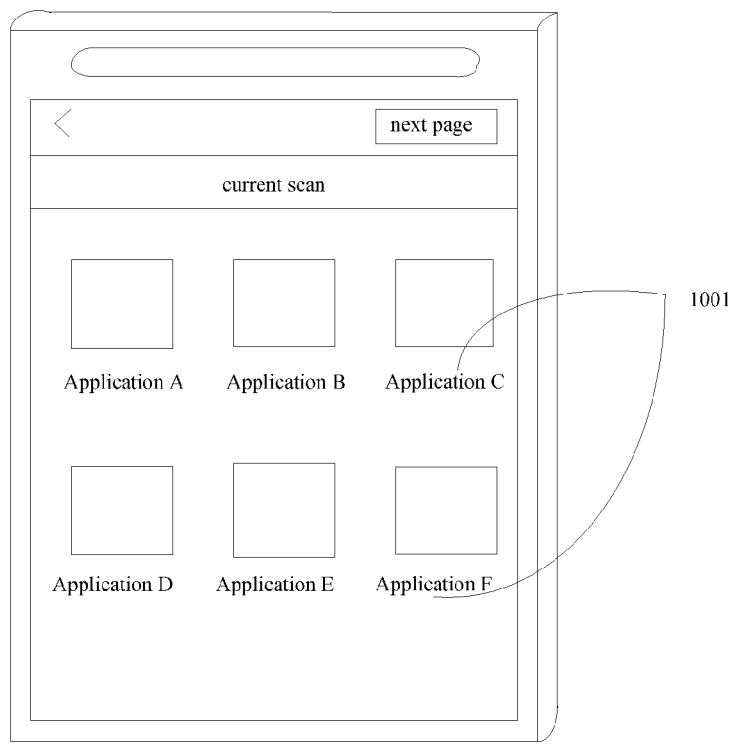
FIG. 10 is a schematic diagram showing that display identifiers are displayed according to the an embodiment of the disclosure.

Reference is made to FIG. 10 which is a schematic diagram showing that display identifiers are displayed according to the first embodiment of the disclosure, as shown in FIG. 10, K display identifiers 1001 correspond to names of K generic applications respectively.

For example, in a case where the name of one wireless access point of the K wireless access points is "Fight the Landlord", the wireless access point is displayed as a string of "Fight the Landlord" on the display module of the first electronic apparatus.

In a specific implementation process, in addition to the name of the corresponding generic application, the display identifier may display the first number of connections for the electronic apparatus currently connected to the wireless access point corresponding to the display identifier.

For example, in a case where there is a wireless access point named "Fight the Landlord" among the K wireless access points and two players have connected to the wireless access point named "Fight the Landlord", a number 2 is also displayed on a display identifier corresponding to the wireless access point named "Fight the Landlord", indicating that two devices have connected to the wireless access point named "Fight the Landlord".

The first electronic apparatus may acquire the first number of connections by: adding 1 to a counter within the second electronic apparatus whenever one electronic apparatus connects to the first wireless access point created by the second electronic apparatus; and adding the number of the connected electronic apparatus into the first display identifier corresponding to the first wireless access point, so that the first electronic apparatus may acquire the first number of connections according to the scanned first display identifier.

Next, the method proceeds to step S904, a second control operation for selecting a first display identifier from the K display identifiers is obtained.

In a specific implementation process, the second control operation may be an operation for an interface, such as a touch-to-click operation or a mouse click operation, performed on a wireless access point selection interface that is run by the first application, and may also be a preset gesture operation or a shaking operation to the first electronic apparatus, which is not enumerated in the embodiment.

Next, the method proceeds to step S905, that is, in response to the second control operation, a communication path directly connected to a first wireless access point corresponding to the first display identifier is established in a wireless link layer; and based on the first display identifier, a first generic application of the N generic applications that corresponds to the first display identifier is started, so as to run the first generic application.

In a specific implementation process, in a case where the first electronic apparatus has the first generic application, the first electronic apparatus may directly call a starting program for the first generic application in the first electronic apparatus after the first generic application is identified according to the first display identifier, to start the first generic application.

For the above second case, i.e., the first electronic apparatus is connected with the server, the starting, based on the first display identifier, a first generic application of the N generic applications that corresponds to the first display identifier includes:

generating a first acquisition request and sending the first acquisition request and the first display identifier to the server;

receiving a first installation file that is returned by the server based on the first acquisition request and used for installing a first generic application corresponding to the first display identifier; and installing and starting the first generic application based on the first installation file.

After the first generic application runs in step S905, the method further includes:

performing data exchange corresponding to the first generic application with a second electronic apparatus via the communication path, with the second electronic apparatus being an electronic apparatus by which the first wireless access point is established.

That is, the first electronic performs data interaction for the first generic application with a second electronic apparatus based on the communication path established in step S905, in which the second electronic apparatus is an electronic apparatus by which the first generic application is run and the first wireless access point is established and the first display identifier for the first wireless access point according to parameter information of the first generic application is generated.

In the embodiment of the disclosure, after the performing data exchange corresponding to the first generic application with a second electronic apparatus via the communication path, the method further includes:
performing data exchange with the second electronic apparatus via the communication path, to enter into a same group of the first generic application with the second electronic apparatus to perform tasks together.

In a specific implementation process, in addition to the first controls that may be selected on a display interface for the first application to scan a surrounding wireless access point, a second controls may be selected on the display interface for the first application to establish a wireless access point so that the established wireless access point may be scanned by other surrounding electronic apparatus. Of course, selection of the first controls or selection of the second controls may be determined according to user's requirements, and there is no ordering limitation for the first controls and the second control.

Specifically, a specific process of selecting a second controls on the display interface for the first application to establish a wireless access point may include:

entering a local generic application list for the first application after a second controls is selected; and after a second generic application is selected in the local generic application list by the user, establish a second wireless access point and using the name of the second generic application as the display identifier for the second wireless access point.

In the following, taking a case that the first electronic apparatus is a smart phone, the second electronic apparatus is a tablet computer and the first generic application is "Application A" as an example, the solution provided in the embodiment will be described in detail from the perspective of human-computer interaction.

First, user "a" starts a first application on the smart phone and clicks on a first controls displayed as an icon of "I want to play a game" on an interface for the first application, then in response to the click operation, a first wireless communication module therein is controlled by the smart phone to scan to acquire M wireless access points, and names of the M wireless access points are display on the interface for the first application.

Next, user "a" selects a first wireless access point named "Application A" from the M wireless access points. In response to the selection operation of the user, a communication connection with the first wireless access point is established by the smart phone, and a first generic application named "Application A" on the smart phone is started.

After the first generic application is started, via the communication connection, user "a" and user "b" of a tablet computer by which the first wireless access point established join into a same game group of "Application A", and may play the game of "Application A" together in the same game group.

Of course, if there is not a game of "Application A" which the user wants to play in the M wireless access points displayed on the interface for the first application, or if user "a" wants to create a new game by himself, then user "a" may enter a local game list interface for a first application program, and establish a wireless access point with "Application A" as a display identifier by selecting a game of "Application A" in the local game list interface, so that the other surrounding electronic apparatus may play the game of "Application A" together with user "a" by selecting the wireless access point with "Application A" as the display identifier.

In another aspect, based on the same inventive concept, the disclosure provides a method for starting a first generic application of the N generic applications based on the first display identifier according to another embodiment of the disclosure, which may be seen in a second embodiment.

A method for information processing applied to a first electronic apparatus, wherein the first electronic apparatus includes a first wireless communication module and a display module, the first electronic apparatus may obtain a first application and N generic applications, N is a positive integer. The first electronic apparatus may be a smart phone, a notebook computer, a tablet computer, a desktop computer and other electronic apparatus, which is not enumerated in the embodiment.

As shown in FIG. 9, after the first electronic apparatus has the first application and in a case where the first wireless communication module is in a working state, the method includes steps S901 to S905:

step S901, acquiring and displaying a first controls when the first application is run;

step S902, receiving a first triggering operation for the first controls, and in response to the received triggering operation, controlling the first wireless communication module to scan to obtain K wireless access points, the K wireless access points having a one-to-one correspondence with K display identifiers, K is a positive integer;

step S903, displaying the K display identifiers by the display module;

step S904, obtaining a second control operation for selecting a first display identifier from the K display identifiers; and step S905, establishing, in response to the second control operation, a communication path directly connected to a first wireless access point corresponding to the first display identifier in a wireless link layer, and starting, based on the first display identifier, a first generic application of the N generic applications that corresponds to the first display identifier so as to run the first generic application.

In the embodiment, in a case where the first electronic apparatus does not have the first generic application corresponding to the first display identifier, starting, based on the first display identifier, a first generic application of the N generic applications includes:

generating a second acquisition request and sending the second acquisition request and the first display identifier to the first wireless access point corresponding to the first display identifier;

receiving, via the communication path, a first installation file that is returned by the first wireless access point based on the second acquisition request and used for installing a first generic application corresponding to the first display identifier; and installing and starting the first generic application based on the first installation file.

After the communication path is established in step S905, even though the first electronic apparatus does not has the first generic application corresponding to the first display identifier and the first electronic apparatus is not connected with any server, a first installation file for the first generic application corresponding to the first display identifier may be acquired by the first electronic apparatus from the first wireless access point via a communication path between the first electronic apparatus and the first wireless access point, thereby achieving installation and starting of the first generic application.

After the first generic application is started, the first electronic may perform data interaction for the first generic application with a second electronic apparatus based on the communication path established in step S905, in which the second electronic apparatus is an electronic apparatus by which the first generic application is run, the first wireless access point is established and the first display identifier for the first wireless access point according to parameter information of the first generic application is generated.

In the following, similarly taking a case that the first electronic apparatus is a smart phone, the second electronic apparatus is a tablet computer and the first generic application is "Application A" as an example, the solution provided in the embodiment will be described in detail from the perspective of human-computer interaction.

First, user "a" starts a first application on the smart phone and clicks on a first controls displayed as an icon of "I want to play a game" on an interface for the first application, then in response to the click operation, a first wireless communication module therein is controlled by the smart phone to scan to acquire M wireless access points, and names of the M wireless access points are display on the interface for the first application.

Next, user "a" selects a first wireless access point named "Application A" from the M wireless access points. In response to the selection operation of the user, a communication connection with the first wireless access point is established by the smart phone, and a second acquisition request and a display identifier of "Application A" is sent to a tablet computer establishing the first wireless access point.

After the second acquisition request is received, an installation file package for the generic application of "Application A" is returned by the tablet computer to the smart phone via the communication connection.

The installation file package is installed by the smart phone and the generic application of "Application A" is started after the installation.

After the generic application of "Application A" is started, via the communication connection, user "a" and user "b" of the tablet computer who establishes the first wireless access point join into a same game group of "Application A", and may play the game of "Application A" together in the same game group.

In yet another aspect, based on the same inventive concept, the disclosure provides an electronic apparatus according to another embodiment of the disclosure, which may be seen in a third embodiment.

The third embodiment provides an electronic apparatus, which is a first electronic apparatus. The first electronic apparatus includes a first wireless communication module and a display module, and the first electronic apparatus can obtain a first application and N generic applications, N is a positive integer. The first electronic apparatus may be a smart phone, a notebook computer, a tablet computer, a desktop computer and other electronic apparatus, which is not enumerated in the embodiment.

Figure 11:
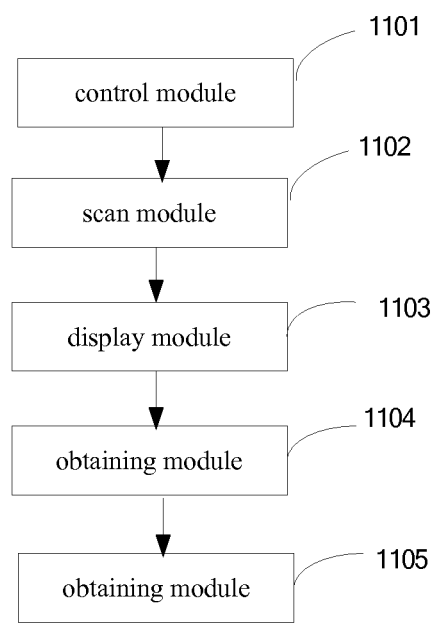
FIG. 11 is a schematic structural diagram of an electronic apparatus according to an embodiment of the disclosure.

Reference is made to FIG. 11 which is a schematic structural diagram of an electronic apparatus according to an embodiment of the disclosure. After the first electronic apparatus has the first application and in a case where the first wireless communication module is in a working state, the electronic apparatus includes a control module 1101, a scan module 1102, a display module 1103, an obtaining module 1104 and a response module 1105.

The control module 1101 is configured to acquire and display a first controls when the first application is run.

The scan module 1102 is configured to receive a first triggering operation for the first controls, and in response to the received triggering operation, control the first wireless communication module to scan to obtain K wireless access points, the K wireless access points having a one-to-one correspondence with K display identifiers, K is a positive integer, here, the K wireless access points correspond to at least one second electronic apparatus.

The display module 1103 is configured to display the K display identifiers.

The obtaining module 1104 is configured to obtain a second control operation for selecting a first display identifier from the K display identifiers.

The response module 1105 is configured to establish, in response to the second control operation, a communication path directly connected to a first wireless access point corresponding to the first display identifier in a wireless link layer, and start, based on the first display identifier, a first generic application of the N generic applications that corresponds to the first display identifier so as to run the first generic application.

In the embodiment, the scan module 1102 includes a first wireless communication module and a filtering unit.

The first wireless communication module is configured to perform scanning to obtain M wireless access points, M≥K.

The filtering unit is configured to perform filtering, based on M display identifiers having a one-to-one correspondence with the M wireless access points, to obtain K wireless access points that satisfy a first preset condition of the M wireless access points.

In the embodiment, the filtering unit is further used to:

perform filtering, based on M display identifiers having a one-to-one correspondence with the M wireless access points, to obtain K wireless access points of the M wireless access points, with display identifiers corresponding to the K wireless access points being display identifiers corresponding to the generic applications which the first electronic apparatus already has.

In the embodiment, in a case where the first electronic apparatus is connected with a server, the filtering unit is further configured to:

perform filtering, based on M display identifiers having a one-to-one correspondence with the M wireless access points, to obtain K wireless access points of the M wireless access points, with display identifiers corresponding to the K wireless access points being display identifiers corresponding to genetic applications within a first preset list, and the generic applications within the first preset list being generic applications stored in the server.

In the embodiment, the response module 1105 includes a first sending unit, a first receiving unit, and a first starting unit.

The first sending unit is configured to generate a first acquisition request and send the first acquisition request and the first display identifier to the server.

The first receiving unit is configured to receive a first installation file that is returned by the server based on the first acquisition request and used for installing a first generic application corresponding to the first display identifier.

The first starting unit is configured to install and start the first generic application based on the first installation file.

In the embodiment, in a case where the first electronic apparatus does not have the first generic application corresponding to the first display identifier, the response module 1105 includes a second sending unit, a second receiving unit, and a second starting unit.

The second sending unit is configured to generate a second acquisition request and send the second acquisition request and the first display identifier to the first wireless access point corresponding to the first display identifier.

The second receiving unit is configured to receive, via the communication path, a first installation file that is returned by the first wireless access point based on the second acquisition request and used for installing a first generic application corresponding to the first display identifier.

The second starting unit is configured to install and start the first generic application based on the first installation file.

In the embodiment, the electronic apparatus further includes:

an exchange module, configured to perform data exchange corresponding to the first generic application with a second electronic apparatus via the communication path, the second electronic apparatus being an electronic apparatus by which the first wireless access point is established.

In the embodiment, the exchange module is further configured to:

perform data exchange with the second electronic apparatus via the communication path, to enter into a same group of the first generic application with the second electronic apparatus.

The electronic apparatus provided in the embodiment and the method for information processing provided embodiments are two aspects based on the same inventive concept. The implementation processes of the methods have been described above in detail, and the structure and implementation process of the electronic apparatus in the embodiment may be understood by those skilled in the art based on clear understanding for the foregoing description, which is not repeated here for clarity.

The technical solutions provided by the embodiments of the disclosure have at least the following three technical effects or advantages.

With the method and electronic apparatus provided by the embodiments of the disclosure, when a first application is run, K display identifiers corresponding to K wireless access points obtained by scanning are displayed; and in a case where a user determines and selects a first display identifier, a communication path to a first wireless access point corresponding to the first display identifier is established, and a first generic application corresponding to the first display identifier is started, so as to achieve a technical effect that in a case where there is no external network, the electronic apparatus can automatically start an application corresponding to a display identifier for a wireless access point when a connection with the wireless access point obtained by scanning is established, thereby reducing operation complexity.

With the method and electronic apparatus provided by the embodiments of the disclosure, a wireless access point is displayed only if a display identifier corresponding to the wireless access point is a display identifier corresponding to a genetic application which the first electronic apparatus already has, so as to achieve a technical effect that an application corresponding to the displayed display identifier can be directly started on the first electronic apparatus without installation, thereby reducing operation complexity.

With the method and electronic apparatus provided by the embodiments of the disclosure, in a case where the first electronic apparatus is connected with a server, a wireless access point is displayed only if a display identifier corresponding to the wireless access point is a display identifier corresponding to a genetic application stored in the server, so as to achieve a technical effect that all installation files for applications corresponding to the displayed display identifiers can be acquired from the server.

Those skilled in the art should understand that, the embodiment of the disclosure may be provided as a method, a system or a computer program product. Therefore, the disclosure may adopt the form of a completely hardware embodiment, a completely software embodiment or an embodiment combined with hardware and software. Further, the disclosure may adopt the form of a computer program product implemented on one or more computer available storage medium containing a computer available program code, including but not limited to a disk storage, a CD-ROM, an optical storage and the like.

The disclosure is described with reference to the flowchart and/or the block diagram of the method, the device (system), and the computer program product according to the embodiments of the disclosure. It should be understood that, each process and/or block in the flowchart and/or the block diagram, and combinations of processes and/or blocks in the flowchart and/or the block diagram may be implemented by computer program instructions. These computer program instructions may be provided to a processor of a general purpose computer, a special purpose computer, an embedded computer or other programmable data processing devices to generate a machine, so that an apparatus for implementing the functions specified in one or more processes of the flow chart and/or one or more blocks of the block diagram may be generated by the instructions performed by the processor of the computer or the other programmable data processing devices.

These computer program instructions may also be stored in a computer readable storage capable of directing the computer or the other programmable data processing devices to work in a specific manner, so that the instructions stored in the computer readable storage generate a manufacture including a command device, in which the command device implements the functions specified in one or more processes of the flow chart and/or one or more blocks of the block diagram.

These computer program instructions may also be loaded on the computer or the other programmable data processing devices, so that a series of operation steps are performed on the computer or the other programmable data processing devices to generate a computer implemented process, thereby, the instructions performed on the computer or the other programmable data processing devices provide steps for implementing the functions specified in one or more processes of the flow chart and/or one or more blocks of the block diagram.

Specifically, the computer program instructions corresponding to the two methods for information processing according to the embodiments of the disclosure may be stored on a storage medium, such as an optical disk, a hard disk, or a U-disk.

For the method for information processing provided by an embodiment, in a case where the computer program instructions in the storage medium that correspond to the method for information processing are read or performed by an electronic apparatus, the following steps are performed:

acquiring and displaying a first controls when the first application is run;

receiving a first triggering operation for the first controls, and in response to the received triggering operation, controlling the first wireless communication module to scan to obtain K wireless access points, the K wireless access points having a one-to-one correspondence with K display identifiers, K is a positive integer here, the K wireless access points correspond to at least one second electronic apparatus;

displaying the K display identifiers by the display module;

obtaining a second control operation for selecting a first display identifier from the K display identifiers; and establishing, in response to the second control operation, a communication path directly connected to a first wireless access point corresponding to the first display identifier in a wireless link layer, and starting, based on the first display identifier, a first generic application of the N generic applications that corresponds to the first display identifier so as to run the first generic application.

Optionally, in a specific implementation process of the computer instructions that are stored in the storage medium and correspond to the step of controlling the first wireless communication module to scan to obtain K wireless access points, the following steps may be included:

controlling the first wireless communication module to scan to obtain M wireless access points, M≥K; and performing filtering, based on M display identifiers having a one-to-one correspondence with the M wireless access points, to obtain K wireless access points that satisfy a first preset condition of the M wireless access points.

Optionally, in a specific implementation process of the computer instructions that are stored in the storage medium and correspond to the step of performing filtering to obtain K wireless access points that satisfy a first preset condition of the M wireless access points, the following steps may be included:

performing filtering to obtain K wireless access points of the M wireless access points, with display identifiers corresponding to the K wireless access points being display identifiers corresponding to the generic applications which the first electronic apparatus already has.

Optionally, in a case where the first electronic apparatus is connected with a server, in a specific implementation process of the computer instructions that are stored in the storage medium and correspond to the step of performing filtering to obtain K wireless access points that satisfy a first preset condition of the M wireless access points, the following steps may be included:

performing filtering to obtain K wireless access points of the M wireless access points, with display identifiers corresponding to the K wireless access points being display identifiers corresponding to generic applications within a first preset list, and the generic applications within the first preset list being generic applications stored in the server.

Optionally, in a specific implementation process of the computer instructions that are stored in the storage medium and correspond to the step of starting, based on the first display identifier, a first generic application of the N generic applications that corresponds to the first display identifier, the following steps may be included:

generating a first acquisition request and sending the first acquisition request and the first display identifier to the server;

receiving a first installation file that is returned by the server based on the first acquisition request and used for installing a first generic application corresponding to the first display identifier; and installing and starting the first generic application based on the first installation file.

Optionally, in a case where the first electronic apparatus does not have the first generic application corresponding to the first display identifier, in a specific implementation process of the computer instructions that are stored in the storage medium and correspond to the step of starting, based on the first display identifier, a first generic application of the N generic applications that corresponds to the first display identifier, the following steps may be included:

generating a second acquisition request and sending the second acquisition request and the first display identifier to the first wireless access point corresponding to the first display identifier;

receiving, via the communication path, a first installation file that is returned by the first wireless access point based on the second acquisition request and used for installing a first generic application corresponding to the first display identifier; and installing and starting the first generic application based on the first installation file.

Optionally, the storage further stores some other computer instructions, which are performed after the computer instructions corresponding to the step of starting, based on the first display identifier, a first generic application of the N generic applications that corresponds to the first display identifier are performed. When these computer instructions are performed, the following steps may be included:

performing data exchange corresponding to the first generic application with a second electronic apparatus via the communication path, the second electronic apparatus being an electronic apparatus by which the first wireless access point is established.

Optionally, the storage further stores some other computer instructions, which are performed after the computer instructions corresponding to the step of performing data exchange corresponding to the first generic application with a second electronic apparatus are performed. When these computer instructions are performed, the following steps may be included:

performing data exchange with the second electronic apparatus via the communication path, to enter into a same group of the first generic application with the second electronic apparatus.

Although preferred embodiments of the disclosure have been described, those skilled in the art may make other variations and changes to these embodiments when they know the basic creative inventive concept. Hence, the claims attached are intended to be interpreted as including the preferred embodiments and all the variations and changes falling within the scope of protection of the disclosure.

Obviously, those skilled in the art may make various changes and variations to the disclosure without departing from the spirit and scope of the disclosure. In this way, if these changes and variations to the disclosure fall within the scope of the claims of the disclosure and its equivalent technology, the disclosure is intended to include these changes and variations.

The invention claimed is:

1. A method for information processing applied to a first electronic apparatus, the first electronic apparatus comprising a first wireless communication module and being able to obtain a first application, in the case that the first electronic apparatus has the first application and the first wireless communication module is in an operating state, the method comprising:
   obtaining, in the case that the first application is run, a first control operation for the first application, the first control operation being for instructing to establish a first group capable of comprising at least two participants;
   during a process for establishing the first group in response to the first control operation, controlling the first wireless communication module to serve as a wireless access point and naming the wireless access point with parameter information for the first group, with the wireless access point generating a radiation signal to make the wireless access point being able to be scanned by at least one second electronic apparatus in the case that the at least one second electronic apparatus is within coverage of the radiation signal;
   establishing, after response information is obtained, a communication path connected to the at least one second electronic apparatus in a wireless link layer, the response information being generated when the wireless access point is scanned and selected by the at least one second electronic apparatus within the coverage of the wireless access point; and
   obtaining, via the communication path, information indicating that the at least one second electronic apparatus joins the first group.

2. The method according to claim 1, wherein the wireless access point is a WIFI hot spot.

3. The method according to claim 1, wherein after the obtaining, via the communication path, information indicating that the at least one second electronic apparatus joins the first group, the method further comprises:
   cutting off the communication path and controlling the first wireless communication module to stop serving as the wireless access point when the first application is stopped.

4. The method according to claim 1, wherein the first electronic apparatus further comprises a display touch unit, the display touch unit comprises a display region; the display region is able to display a target object denoting the at least one second electronic apparatus when the first application is run by the first electronic apparatus; the establishing a communication path directly connected to the at least one second electronic apparatus in a wireless link layer comprises:
   receiving a second control operation by the display touch unit, wherein the second control operation is acted on the target object;
   receiving a first identification in response to the second control operation, wherein the first identification is for identifying the at least one second electronic apparatus;
   acquiring first information according to the first identification, wherein the first information is for identifying the at least one second electronic apparatus; and
   displaying the first information within the display region;
   establishing a communication path connected to the at least one second electronic apparatus in a wireless link layer according to the first information,
   wherein data amount of the first information is greater than data amount of the first identification.

5. The method according to claim 4, wherein the first identification is a communication number of the at least one second electronic apparatus or a MAC address of the at least one second electronic apparatus.

6. The method according to claim 4, wherein the first electronic apparatus comprises a storage unit; the first information is stored in the storage unit in advance;
   the acquiring first information according to the first identification comprises:
   querying the first information stored in the storage unit according to the first identification.

7. The method according to claim 4, wherein the first information is stored in a third electronic apparatus,
   the acquiring first information according to the first identification comprises:
   acquiring the first information stored in the third electronic apparatus according to the first identification.

8. The method according to claim 1, wherein the first electronic apparatus further comprises a display module, the first electronic apparatus is able to obtain a first application and N generic applications, N is a positive integer, the establishing a communication path directly connected to the at least one second electronic apparatus in a wireless link layer comprises:
   acquiring and displaying a first controls when the first application is run;
   receiving a first triggering operation for the first controls, and in response to the received triggering operation, controlling the wireless communication module to scan to obtain K wireless access points which correspond to the at least one second electronic apparatus, the K wireless access points having a one-to-one correspondence with K display identifiers, K is a positive integer, the K wireless access points correspond to at least one second electronic apparatus;
   displaying the K display identifiers by the display module;
   obtaining a second control operation for selecting a first display identifier from the K display identifiers; and
   establishing, in response to the second control operation, a communication path directly connected to a first wireless access point corresponding to the first display identifier in a wireless link layer;
   the obtaining, via the communication path, information indicating that the at least one second electronic apparatus joins the first group comprise:
   starting, based on the first display identifier, a first generic application of the N generic applications that corresponds to the first display identifier to run the first generic application.

9. The method according to claim 8, wherein controlling the wireless communication module to scan to obtain K wireless access points comprise:
   controlling the first wireless communication module to scan to obtain M wireless access points, M≥K; and
   performing filtering, based on M display identifiers having a one-to-one correspondence with the M wireless access points, to obtain K wireless access points of the M wireless access points that satisfy a first preset condition.

10. The method according to claim 9, wherein the first preset condition is that: a display identifier corresponding to the wireless access point is a display identifier corresponding to the genetic application which the first electronic apparatus already has.

11. An electronic apparatus, which is a first electronic apparatus, the first electronic apparatus comprising a first wireless communication module and being able to obtain a first application, in the case that the first electronic apparatus has the first application and the first wireless communication module is in an operating state, the electronic apparatus comprising:
   a first obtaining module, configured to obtain, in the case that the first application is run, a first control operation for the first application, the first control operation being for instructing to establish a first group capable of comprising at least two participants;
   a first response module, configured for, during a process for establishing the first group in response to the first control operation, controlling the wireless communication module to serve as a wireless access point and naming the wireless access point with parameter information for the first group, with the wireless access point generating a radiation signal, to make the wireless access point being able to be scanned by at least one second electronic apparatus in the case that at least one second electronic apparatus is within coverage of the radiation signal; and
   a first establishing module, configured for, after response information is obtained, establishing a communication path directly connected to the at least one second electronic apparatus in a wireless link layer, the response information being response information generated when the wireless access point is scanned and selected by the at least one second electronic apparatus within coverage of the wireless access point, and obtaining, via the communication group, information indicating that the at least one second electronic apparatus joins the first group.

12. The electronic apparatus according to claim 11, wherein the wireless access point is a WIFI hot spot.

13. The electronic apparatus according to claim 11, wherein the first electronic apparatus further comprises:
   a first cutting off module, configured to, when the first application is stopped, cut off the communication path and control the wireless communication module to stop serving as the wireless access point.

14. The electronic apparatus according to claim 11, the first electronic apparatus further comprises a display touch unit, and the first establishing module comprises a processing unit and a receiving unit, the display touch unit comprises a display region; the processing unit is able to run a first application; and the display region is able to display a target object denoting the at least one second electronic apparatus when the first application is run by the processing unit;
   the display touch unit is further configured to receive a second control operation, the second control operation is acted on the target object;
   the receiving unit is configured to receive a first identification based on the second control operation, the first identification is for identifying the at least one second electronic apparatus;
   the processing unit is further configured to acquire first information according to the first identification, the first identification is for identifying the at least one second electronic apparatus;
   the display touch unit is further configured to display the first information within the display region; and
   the processing unit is further configured to establish a communication path connected to the at least one second electronic apparatus in a wireless link layer according to the first information,
   wherein data amount of the first information is greater than data amount of the first identification.

15. The electronic apparatus according to claim 14, wherein the first identification is a communication number of the at least one second electronic apparatus or a MAC address of the at least one second electronic apparatus.

16. The electronic apparatus according to claim 14, wherein the first electronic apparatus comprises a storage unit;
   the storage unit is configured to store the first information in advance;
   the processing unit is configured to query the first information stored in the storage unit according to the first identification.

17. The electronic apparatus according to claim 14, wherein the first information is stored in a third electronic apparatus;
   the processing unit is configured to acquire the first information stored in the third electronic apparatus according to the first identification.

18. The electronic apparatus according to claim 14, wherein the first electronic apparatus further comprises a display module, the first electronic apparatus is able to obtain a first application and N generic applications, N is a positive integer, and after the first electronic apparatus has the first application and in a case where the first wireless communication module is in a working state, the first establishing module comprises:
   a control module, configured to acquire and display a first controls when the first application is run;
   a scan module, configured to receive a first triggering operation for the first controls, and in response to the received triggering operation, control the wireless communication module to scan to obtain K wireless access points which corresponds to the at least one second electronic apparatus, the K wireless access points having a one-to-one correspondence with K display identifiers, K is a positive integer, the K wireless access points correspond to at least one second electronic apparatus;
   a display module, configured to display the K display identifiers;
   an obtaining module, configured to obtain a second control operation for selecting a first display identifier from the K display identifiers; and
   a response module, configured to establish, in response to the second control operation, a communication path connected to a first wireless access point corresponding to the first display identifier in a wireless link layer;
   the first establishing module, further configured to start, based on the first display identifier, a first generic application of the N generic applications that corresponds to the first display identifier so as to run the first generic application.

19. The electronic apparatus according to claim 18, wherein the scan module comprises:
   the first wireless communication module, configured to perform scanning to obtain M wireless access points, M≥K; and
   a filtering unit, configured to perform filtering, based on M display identifiers having a one-to-one correspondence with the M wireless access points, to obtain K wireless access points of the M wireless access points that satisfy a first preset condition.

20. The electronic apparatus according to claim 19, wherein the filtering unit is further configured to perform filtering, based on M display identifiers having a one-to-one correspondence with the M wireless access points, to obtain K wireless access points of the M wireless access points, with display identifiers corresponding to the K wireless access points being display identifiers corresponding to the generic applications which the first electronic apparatus already has.

* * * * *